(12) United States Patent
Shiraishi et al.

(10) Patent No.: US 8,164,711 B2
(45) Date of Patent: Apr. 24, 2012

(54) LIQUID CRYSTAL DISPLAY DEVICE

(75) Inventors: Yasuhisa Shiraishi, Mobara (JP); Atsushi Tsuruoka, Mobara (JP); Akiyoshi Tobe, Mobara (JP); Shigeki Nishizawa, Mobara (JP); Toshihiro Yajima, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 364 days.

(21) Appl. No.: 12/464,127

(22) Filed: May 12, 2009

(65) Prior Publication Data
US 2009/0284688 A1 Nov. 19, 2009

(30) Foreign Application Priority Data
May 14, 2008 (JP) .................................. 2008-127301

(51) Int. Cl.
*G02F 1/13357* (2006.01)
(52) U.S. Cl. ............................. 349/65; 385/146; 362/626
(58) Field of Classification Search ........................ None
See application file for complete search history.

(56) References Cited

U.S. PATENT DOCUMENTS

| | | | | |
|---|---|---|---|---|
| 5,712,694 A * | 1/1998 | Taira et al. | ........................ | 349/9 |
| 5,995,183 A * | 11/1999 | Tsuyoshi | ..................... | 349/112 |
| 6,454,452 B1 * | 9/2002 | Sasagawa et al. | ............. | 362/561 |
| 6,850,295 B1 * | 2/2005 | Miyatake et al. | ............. | 349/112 |
| 7,295,261 B2 * | 11/2007 | Chen et al. | ..................... | 349/62 |
| 2001/0035927 A1 * | 11/2001 | Sasagawa et al. | ............. | 349/113 |
| 2003/0021100 A1 * | 1/2003 | Mabuchi | .......................... | 362/31 |
| 2003/0076465 A1 * | 4/2003 | Shimoda et al. | ............... | 349/113 |
| 2004/0012732 A1 * | 1/2004 | Sugiura | ............................ | 349/65 |
| 2004/0218114 A1 * | 11/2004 | Lee et al. | ........................ | 349/65 |
| 2006/0077688 A1 * | 4/2006 | Uehara et al. | .................. | 362/613 |
| 2007/0030427 A1 * | 2/2007 | Hisatake | ........................ | 349/117 |
| 2007/0030698 A1 * | 2/2007 | Miyashita | ..................... | 362/626 |
| 2008/0165308 A1 * | 7/2008 | Shiraishi et al. | ................ | 349/65 |
| 2010/0182534 A1 * | 7/2010 | Usukura et al. | ................. | 349/62 |

FOREIGN PATENT DOCUMENTS

| | | | | |
|---|---|---|---|---|
| JP | 2001-108835 A | * | 4/2001 | |
| JP | 2003-272424 A | * | 9/2003 | |
| JP | 2004-192909 | | 7/2004 | |

* cited by examiner

*Primary Examiner* — Mike Stahl
(74) *Attorney, Agent, or Firm* — Antonelli, Terry, Stout & Kraus, LLP.

(57) ABSTRACT

A liquid crystal display device which can make the surface brightness of an edge-light-type backlight uniform is provided. The liquid crystal display device includes a liquid crystal display panel and a backlight which radiates light to the liquid crystal display panel. The backlight includes a light guide plate which is arranged on a back side of the liquid crystal display panel, a light source arranged on an outer peripheral portion of a first main surface of the light guide plate which faces the liquid crystal display panel in an opposed manner, and a reflection sheet which is arranged on a back side of the light guide plate as viewed from the liquid crystal display panel. The light guide plate is made of a transparent resin having a refractive index of 1.53 or less. On a surface of the light guide plate opposite to the first main surface, a second main surface which is substantially parallel to the first main surface and a plurality of inclined surfaces which are inclined at a preset angle with respect to the second main surface are formed. An angle of the inclined surface positioned near a position at which light from the light source is incident and an angle of the inclined surface positioned remote from the position at which the light from the light source from the light source is incident differ from each other.

20 Claims, 19 Drawing Sheets

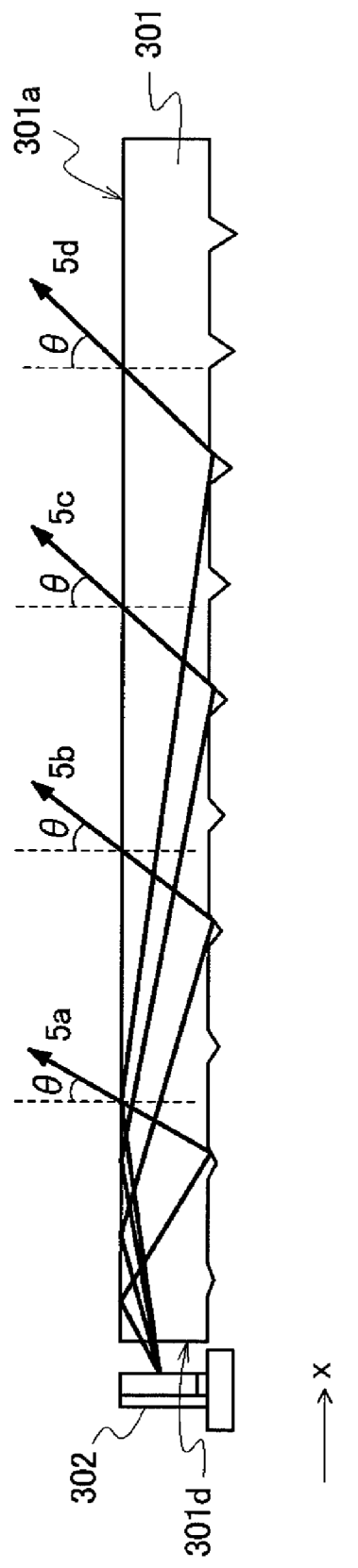

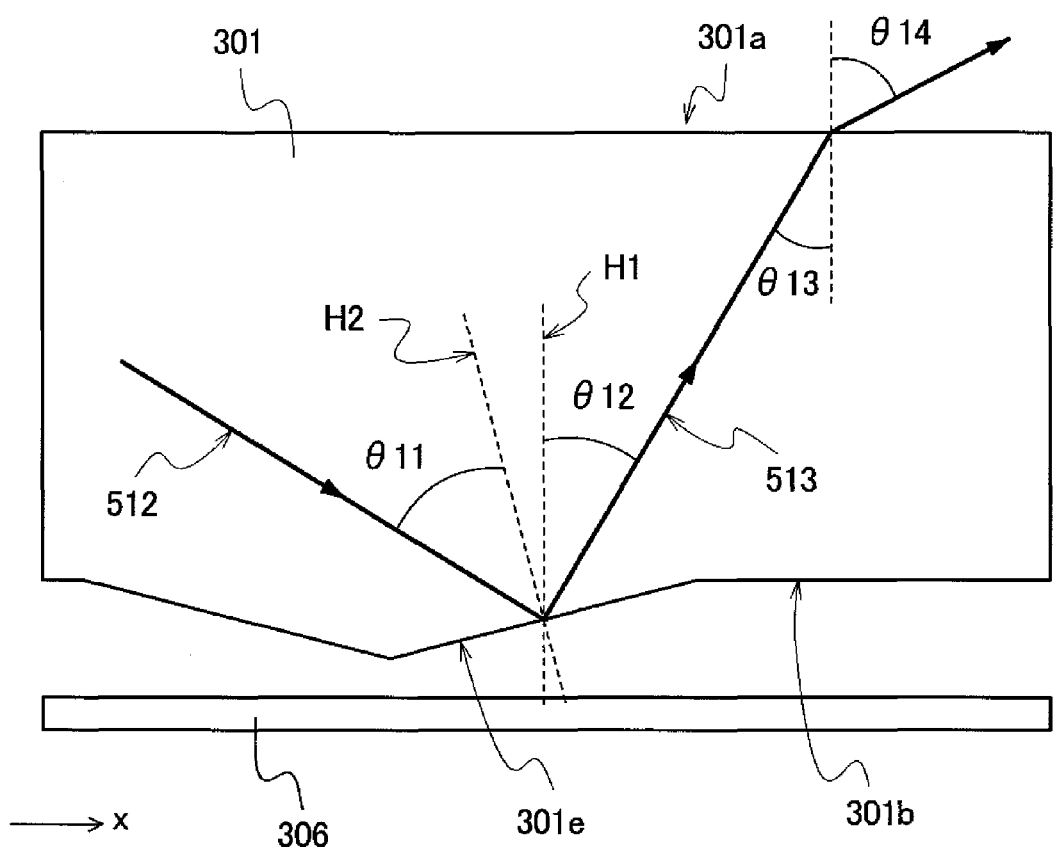

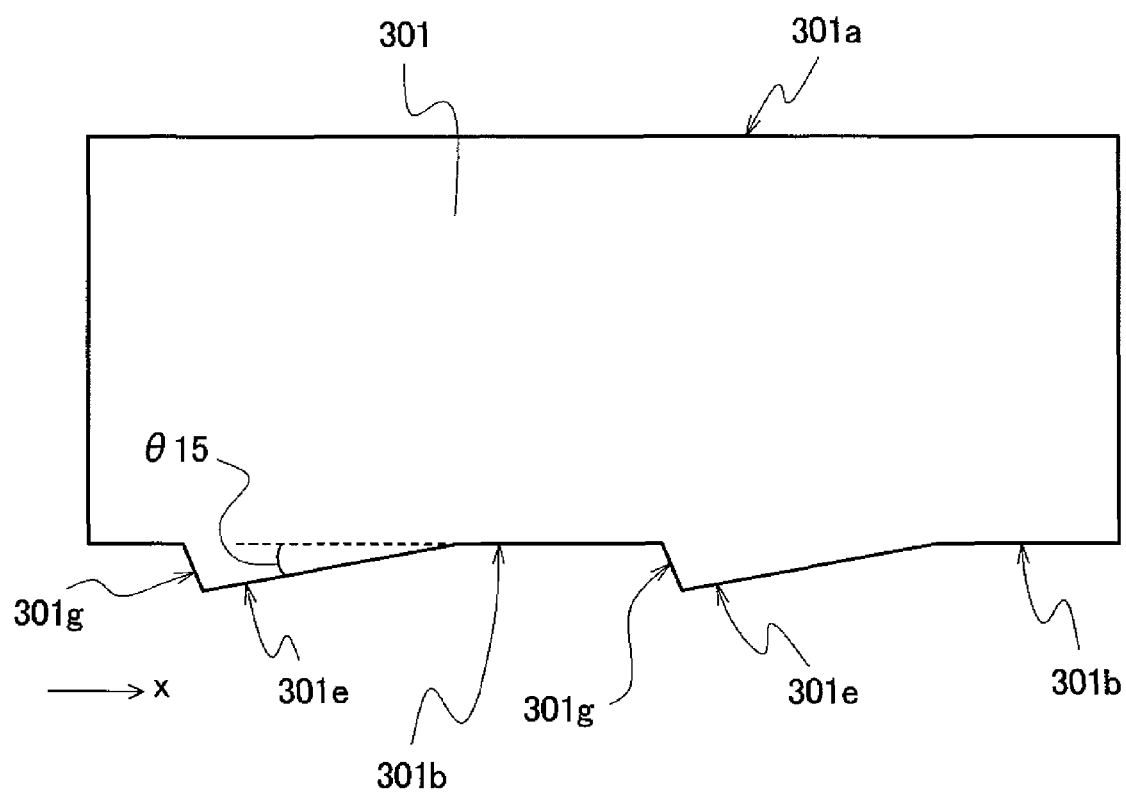

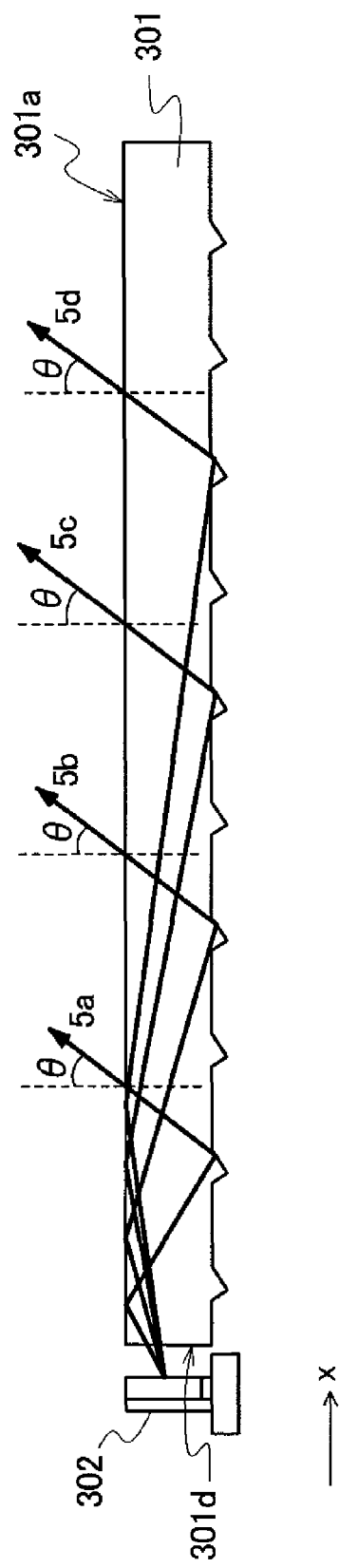

LIQUID CRYSTAL DISPLAY DEVICE

CROSS-REFERENCE TO RELATED APPLICATION

The present application claims priority from Japanese application JP 2008-127301 filed on May 14, 2008, the content of which is hereby incorporated by reference into this application.

BACKGROUND OF THE INVENTION

1. Field of the Invention

The present invention relates to a liquid crystal display device, and more particularly to a liquid crystal display device having a backlight which includes a light guide plate and light emitting diodes.

2. Background Art

Conventionally, the liquid crystal display device has been used as a display part of portable electronic equipment, for example, because of a reduced thickness, a reduced weight and small electric power consumption.

The liquid crystal display device is not of a self-luminous type and hence, a planar lighting device which is referred to as a backlight is arranged on a back surface of a liquid crystal display panel, for example. Although a conventional backlight uses a fluorescent lamp such as a cold cathode ray tube as a light source (light emitting element), light emitting diodes (LED) have been popularly used as a backlight recently.

The backlight is roughly classified into a direct backlight and an edge-light-type (light-guide-plate) backlight. In the direct backlight, a light source is arranged on a back side of a display region of a liquid crystal display panel. On the other hand, in the edge-light-type backlight, a light guide plate is arranged on a back side of a display region of a liquid crystal display panel. The light guide plate radiates light from a light source in a planar shape, and radiates the light to the liquid crystal display panel.

The light guide plate is formed using a light transmitting resin, for example. Light which is incident on the light guide plate from the light source propagates in the light guide plate. Reflecting/scattering members such as grooves, projections or prints are formed on the light guide plate. Light which propagates in the light guide plate is reflected or scattered by the reflecting/scattering members, and is radiated toward a liquid crystal display device side.

With respect to the light guide plate used in the backlight of the liquid crystal display device, it is desirable that a light quantity (surface brightness) of light radiated from the light guide plate is uniform and, at the same time, the polarization direction is uniform over the whole surface of a light radiation surface of the light guide plate.

With respect to the conventional backlight, there has been known a method in which, to make the surface brightness of light radiated from the light guide plate uniform, apex angles of prisms formed on a light radiation surface of the light guide plate are changed corresponding to a distance from a light source. This method is proposed in JP-A-2004-192909, for example.

SUMMARY OF THE INVENTION

In the edge-light-type backlight which uses a light emitting diode as a light source, in general, a plurality of light emitting diodes is arranged along a light incident surface of the light guide plate. Accordingly, light emitting points are arranged in a scattered manner. Further, light which is incident on the light guide plate from the light emitting diode hardly spreads in many directions in the light guide plate. Accordingly, it is difficult for the backlight which uses the light emitting diodes to uniformly radiate light in the vicinity of the light incident surface of the light guide plate thus giving rise to a drawback that it is difficult to make the surface brightness uniform.

Further, with respect to the edge-light-type backlight which uses the light emitting diodes as the light source, a backlight which forms grooves on a bottom surface (a surface opposite to a surface which faces a liquid crystal display panel) of the light guide plate for radiating light from the light guide plate has been put into practice. However, such a light guide plate has a drawback that angles of radiating lights are deviated.

Further, in the conventional edge-light-type backlight, to make surface brightness of light radiated from the light guide plate uniform, the light guide plate uses a plurality of prism sheets or a plurality of light diffusion sheets in combination. Accordingly, a liquid crystal display device which is provided with the conventional edge-light-type backlight has a drawback that the reduction of thickness of the liquid crystal display device is difficult or a drawback that a manufacturing cost of the liquid crystal display device is pushed up.

It is an object of the present invention to provide a technique which, in a liquid crystal display device having an edge-light-type backlight, for example, can easily make surface brightness of the backlight uniform.

It is another object of the present invention to provide a technique which, in a liquid crystal display device having an edge-light-type backlight, for example, can make surface brightness uniform while decreasing the number of parts of the backlight.

The above-mentioned and other objects and novel features of the present invention will become apparent from the description of this specification and attached drawings.

To schematically explain typical invention among the inventions disclosed in this specification, their as follows.

According to one aspect of the present invention, there is provided a liquid crystal display device having a liquid crystal display panel and a backlight which radiates light to the liquid crystal display panel, wherein the backlight includes a light guide plate and a light source arranged on an outer peripheral portion of the light guide plate, the light guide plate is made of a transparent plastic resin having a refractive index of 1.53 or less, the light guide plate has a first main surface and a second main surface which faces the first main surface in an opposed manner, the second main surface has a plurality of inclined surfaces, and the inclined surfaces are formed such that an angle of the inclined surface positioned near the light source and an angle of the inclined surface positioned remote from the light source differ from each other.

A light diffusion sheet may be arranged between the light guide plate and the liquid crystal display panel, and the polarization direction of light radiated from the light guide plate and the polarization direction of the light diffusion sheet may be set equal to each other.

With respect to the plurality of first inclined surfaces, the angle of the first inclined surface positioned near the light source may be set larger than the angle of the first inclined surface positioned remote from the light source.

The angle of the first inclined surface positioned near the light source may be set to 4 degrees or less.

The second main surface may have a plurality of second inclined surfaces, an angle of the second inclined surface may be set larger than the angle of the first inclined surface, and an area of one second inclined surface may be set smaller than an area of one first inclined surface.

Light emitting diodes may be used as the light source.

The light guide plate may have one side surface which abuts on the first main surface, and the first inclined surfaces may extend in the direction parallel to the side surface and may be arranged parallel to each other in the direction orthogonal to the side surface.

The backlight may have a prism sheet arranged between the first main surface and the liquid crystal display panel, and a cross section of the prism sheet may have an asymmetrical shape.

The first inclined surface may project outwardly from the second main surface.

The first inclined surface may be recessed inwardly from the second main surface.

According to the liquid crystal display device of the present invention, it is possible to easily make surface brightness of an edge-light-type backlight uniform.

Further, according to the liquid crystal display device of the present invention, the number of parts of the edge-light-type backlight can be decreased and, at the same time, the surface brightness of the backlight can be made uniform.

BRIEF DESCRIPTION OF THE DRAWINGS

FIG. 3A is a schematic cross-sectional view showing lights radiated from four points which are different from each other in distance from a light incident surface of the light guide plate;

FIG. 5B is a schematic cross-sectional view showing one example of a transmission path of light when light reflected on the inclined surface of the light guide plate is radiated from a first main surface;

FIG. 6A is a schematic cross-sectional view showing one example of the cross-sectional constitution of the backlight;

FIG. 6B is a schematic cross-sectional view showing one example of manner of operation and advantageous effects of the backlight;

DETAILED DESCRIPTION OF THE EMBODIMENTS

Hereinafter, the present invention is explained in detail based on preferred embodiments in conjunction with drawings.

Here, in all drawings for explaining the embodiment, parts having identical functions are given same numerals and their repeated explanation is omitted.

FIG. 1A to FIG. 1F are schematic views showing one example of the schematic constitution of a liquid crystal display device according to the present invention.

Figure 1A:
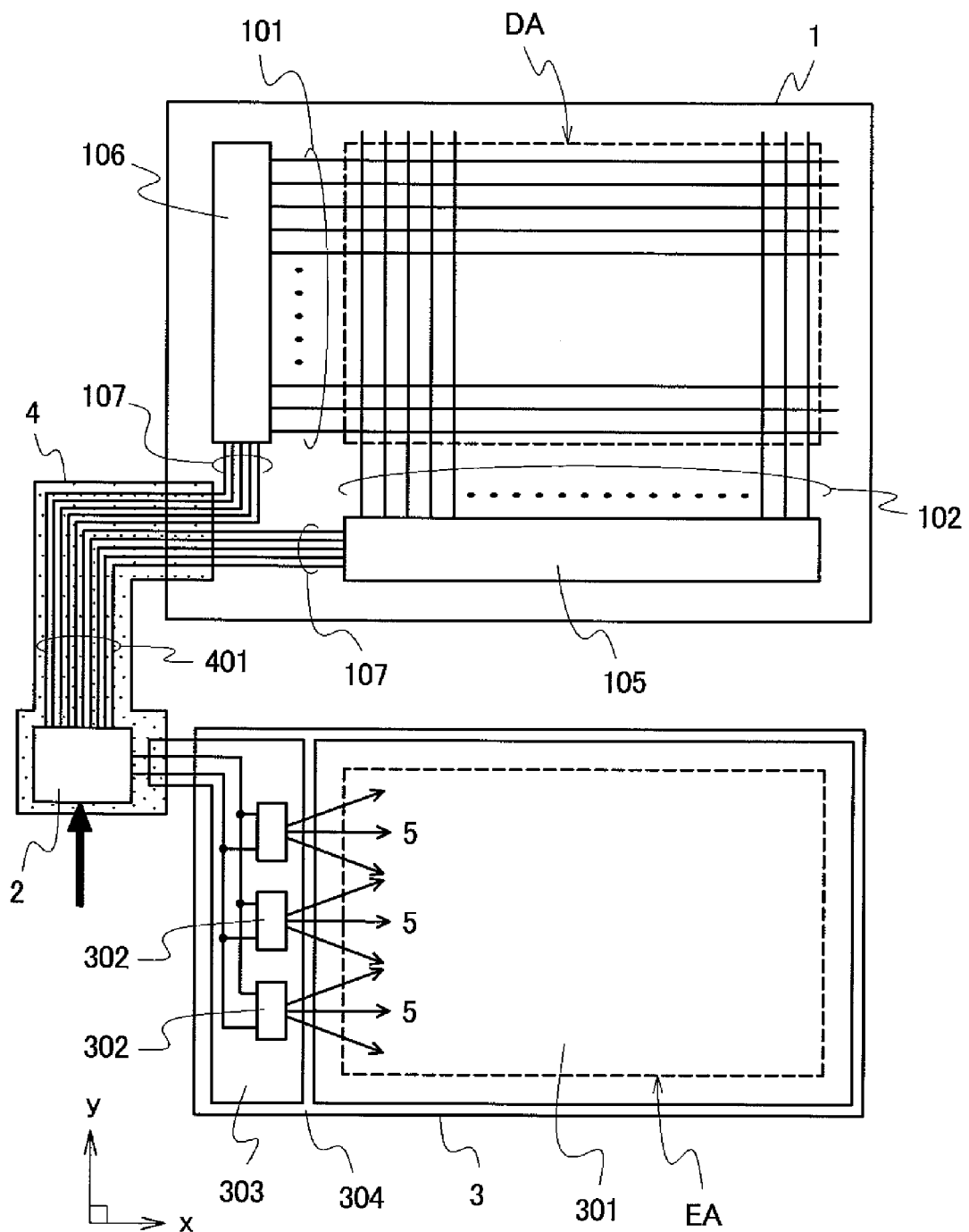
FIG. 1A is a schematic functional block diagram showing one example of the schematic constitution of an essential part of a liquid crystal display device.
Figure 1B:
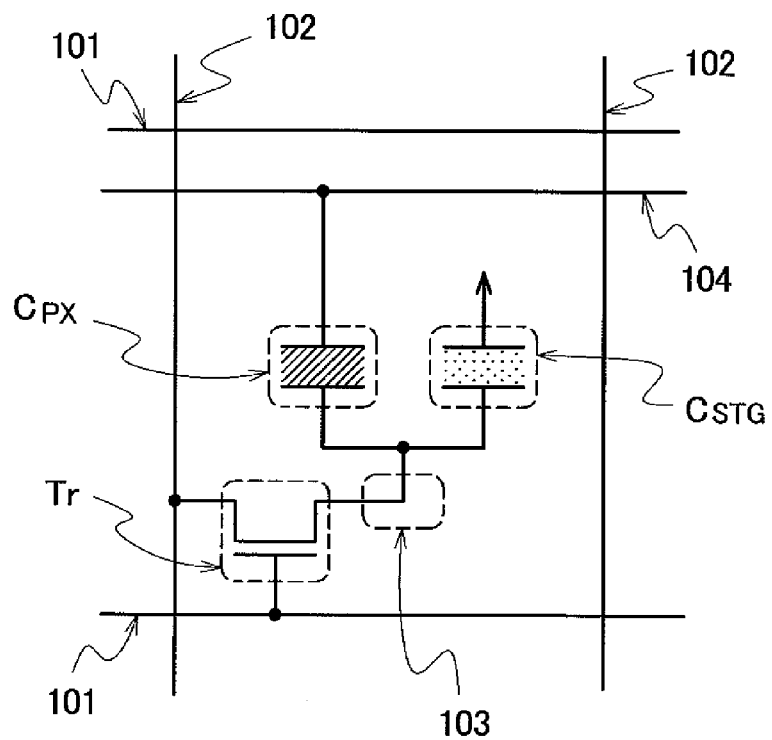
FIG. 1B is a schematic circuit diagram showing one example of the circuit constitution of one pixel of a liquid crystal display panel.
Figure 1C:
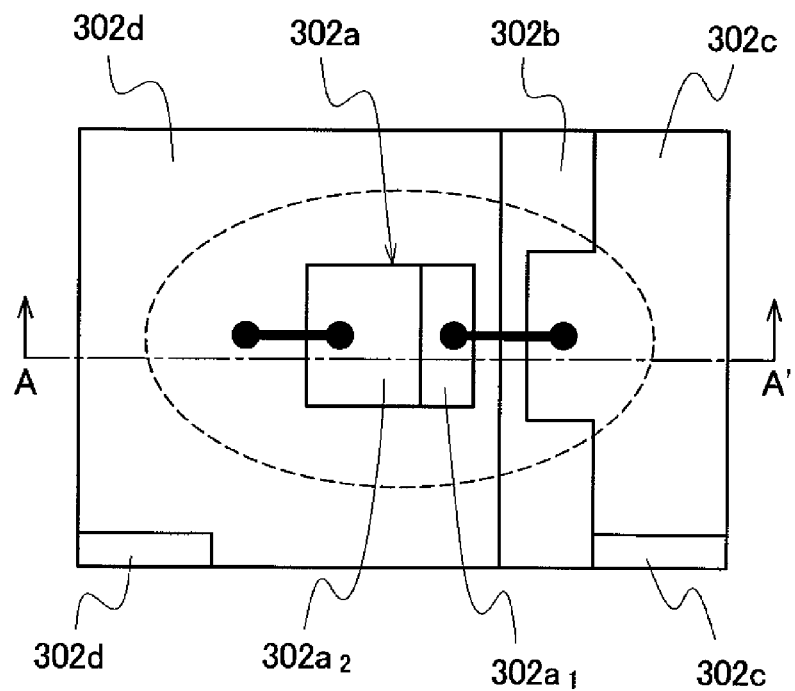
FIG. 1C is a schematic plan view showing one example of the schematic constitution of a light emitting diode.
Figure 1D:
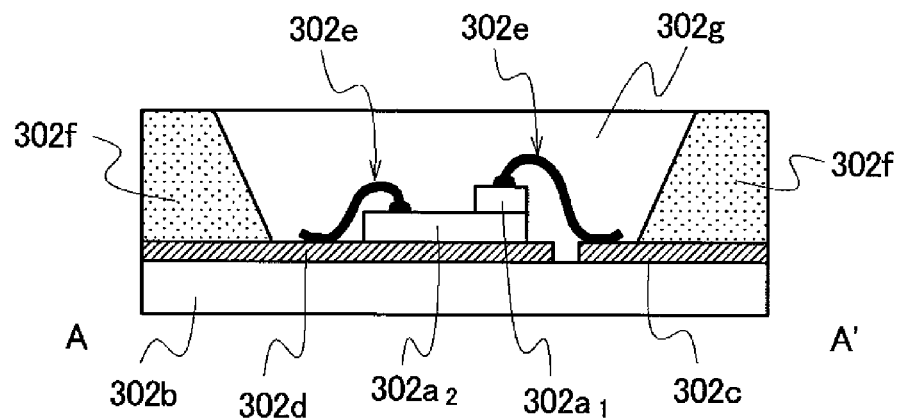
FIG. 1D is a schematic cross-sectional view showing one example of the cross-sectional constitution of the light emitting diode taken along a line A-A' in FIG. 1C as viewed in the arrow direction.
Figure 1E:
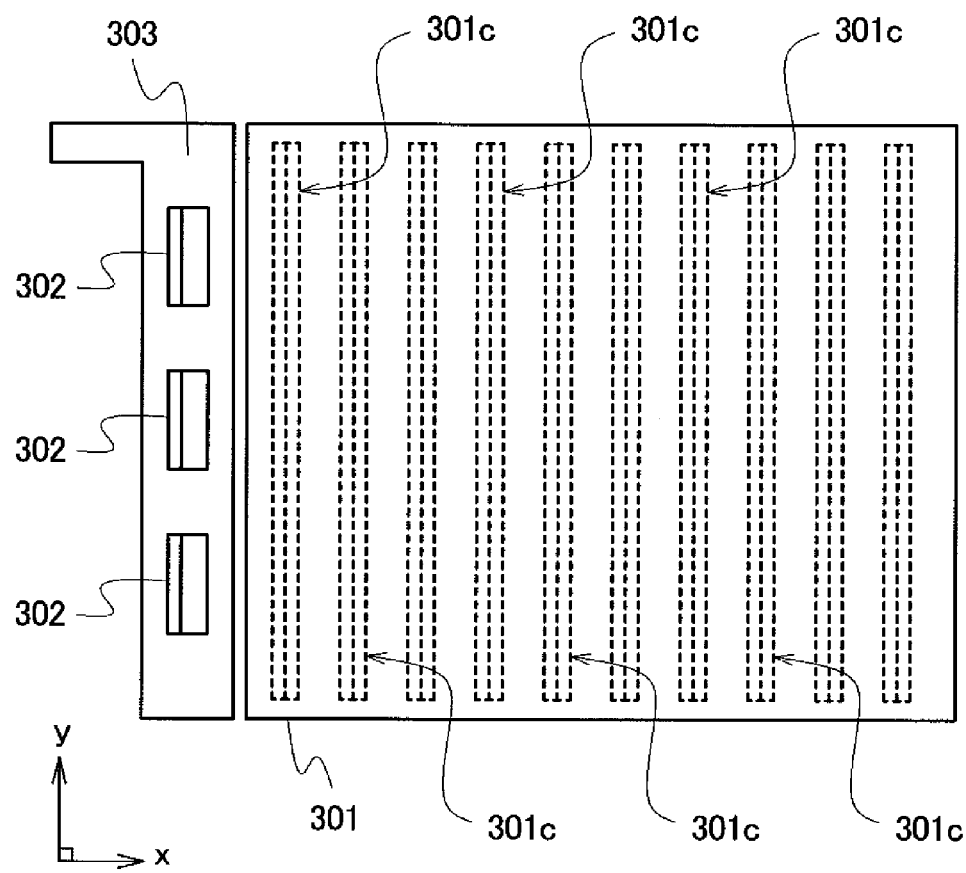
FIG. 1E is a schematic plan view showing one example of the schematic constitution of the light guide plate.
Figure 1F:
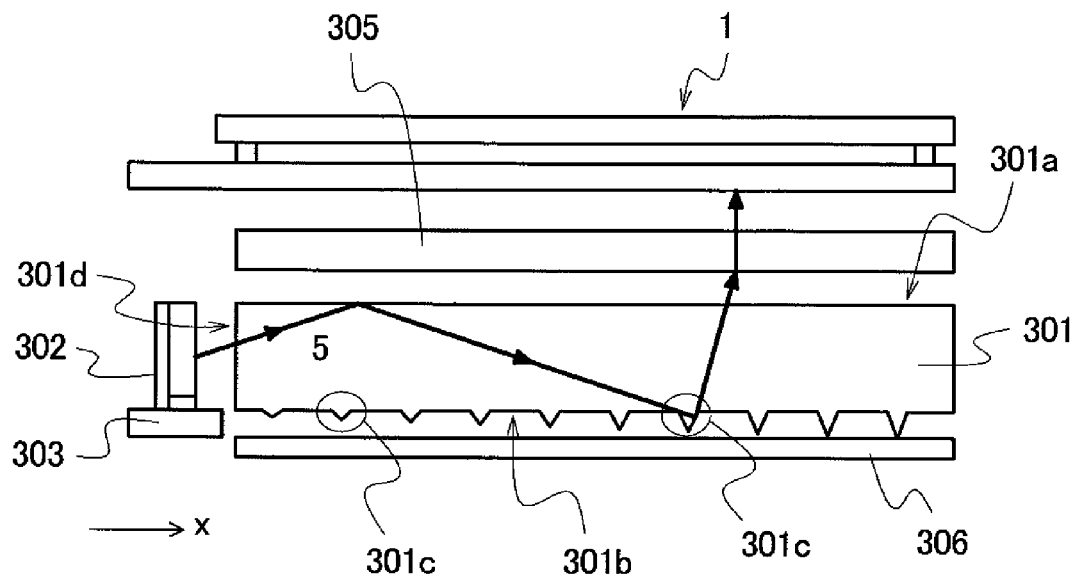
FIG. 1F is a schematic side view showing operational principle of a backlight.

FIG. 1A is a schematic functional block diagram showing one example of the schematic constitution of an essential part of a liquid crystal display device. FIG. 1B is a schematic circuit diagram showing one example of the circuit constitution of one pixel of the liquid crystal display panel. FIG. 1C is a schematic plan view showing one example of the schematic constitution of a light emitting diode. FIG. 1D is a schematic cross-sectional view showing one example of the cross-sectional constitution of the light emitting diode taken along a line A-A' in FIG. 1C as viewed in the arrow direction. FIG. 1E is a schematic plan view showing one example of the schematic constitution of the light guide plate. FIG. 1F is a schematic side view showing an operational principle of a backlight.

The liquid crystal display device according to the present invention includes, as shown in FIG. 1A, a liquid crystal display panel 1, a control circuit 2 and a backlight 3, for example. The liquid crystal display panel 1 is a display panel constituted by hermetically filling a liquid crystal material in a gap defined between a pair of substrates consisting of a TFT substrate and a counter substrate. On the TFT substrate, a plurality of scanning signal lines 101 and a plurality of video signal lines 102 are arranged.

A display region DA of the liquid crystal display panel 1 corresponds to a region which is surrounded by two outermost scanning signal lines 101 and two outermost video signal lines 102. The display region DA is formed of a mass of a plurality of pixels. A region which one pixel occupies corresponds to a region surrounded by two neighboring scanning signal lines 101 and two neighboring video signal lines 102.

As shown in FIG. 1B, for example, one pixel includes a TFT element Tr, a pixel electrode 103 which is connected to the TFT element Tr, a pixel capacity $C_{PX}$ and a holding capacity $C_{STG}$. The pixel capacity $C_{PX}$ is also referred to as a liquid crystal capacity, and is generated by the pixel electrode 103, a counter electrode which is connected to a common line 104 and the liquid crystal material. Further, the holding capacity $C_{STG}$ is a capacity generated by the pixel electrode 103, a holding capacity line, and an insulation layer which is interposed between the pixel electrode 103 and the holding capacity line, for example. Recently, there also has been a liquid crystal display panel 1 which does not include the holding capacity $C_{STG}$.

The video signal lines 102 are connected to a first drive circuit 105, and the scanning signal lines 101 are connected to a second drive circuit 106. The first drive circuit 105 is, for example, a circuit which generates a video signal applied to the respective video signal lines 102. The second drive circuit 106 is, for example, a circuit which generates a signal for selecting pixels in which a video signal applied to the respective video signal lines 102 is written in synchronism with an operation of the first drive circuit 105. The first drive circuit 105 and the second drive circuit 106 may be formed of an IC chip which is mounted on the liquid crystal display panel 1 or a circuit which is incorporated in the TFT substrate of the liquid crystal display panel 1, for example.

The control circuit 2 converts a signal inputted from the outside into a signal necessary for the operation of the liquid crystal display panel 1 and supplies the converted signal to the liquid crystal display panel 1. A power source voltage is supplied to the liquid crystal display panel 1 and the backlight 3 from the control circuit 2. The control circuit 2 is mounted on a flexible printed circuit board 4, and the signals and the power source voltages necessary for the operation of the liquid crystal display panel 1 is transmitted to the first drive circuit 105 and the second drive circuit 106 via lines 401 formed on the flexible printed circuit board 4 and lines 107 formed on the liquid crystal display panel 1.

The backlight 3 includes a light guide plate 301, light emitting diodes 302, a flexible printed circuit board 303 and a housing case 304. The backlight 3 is a lighting means for radiating light to the liquid crystal display panel 1 and is a planar lighting device which converts light emitted from the light emitting diode 302 into planar light beams by the light guide plate 301, and radiates the planar beams to the liquid crystal display panel 1. In FIG. 1A, the liquid crystal display panel 1 and the backlight 3 are arranged at an upper part and a lower part of the drawing respectively. However, in an actual liquid crystal display device, the backlight 3 is, for example, arranged on a back side of the liquid crystal display panel such that a region EA of the light guide plate 301 overlaps with the display region DA.

A first main surface of light guide plate 301 which faces the liquid crystal display panel 1 in an opposed manner has an approximately rectangular shape. A plurality of light emitting diodes 302 is arranged along one side surface which abuts on one side of the first main surface. Here, the light emitting diodes 302 are mounted on the flexible printed circuit board 303, and electricity necessary for turning on the light emitting diodes 302 is supplied to the light emitting diodes 302 from the control circuit 2 via the lines formed on a flexible printed circuit board 4 and, a flexible printed circuit board 303.

As shown in FIG. 1C and FIG. 1D, the light emitting diode 302 has, for example, the structure in which an LED chip 302a which constitutes a light emitting part is mounted on a chip substrate 302b. The LED chip 302a has a pn junction. When an electric current is supplied to the pn junction in a state that a predetermined voltage is applied to the pn junction, light having a specific wavelength is radiated. A p-type semiconductor layer which forms the pn junction is formed of a p-electrode (anode) $302a_1$, while an n-type semiconductor layer which forms the pn junction is formed of an n-electrode (cathode) $302a_2$.

The p-electrode $302a_1$ and a first terminal 302c of the chip substrate 302b are connected with each other using a bonding wires 302e, and the n-electrode $302a_2$ and a second terminal 302d of the chip substrate 302b are connected with each other using a bonding wire 302e.

On an LED-chip-mounting surface of the chip substrate 302b, a reflection member 302f having a shape which surrounds the LED chip 302a is mounted. Due to the reflection member 302f, light emitted from the LED chip 302a is collected, and the collected light is radiated to the outside.

On a light-radiation-surface side of the LED chip 302a, for example, a fluorescent light emitting member 302g may be also mounted. The fluorescent light emitting member 302g is a member which has a function of changing a wavelength of light emitted from the LED chip 302a.

As shown in FIG. 1E and FIG. 1B, the light guide plate 301 is a plate-shaped member, for example, and a first main surface 301a of the light guide plate 301 which faces the liquid crystal display panel has a rectangular shape. The light guide plate 301 is made of a plastic resin. That is, the light guide plate 301 is made of a material having a light transmitting property such as a polycarbonate resin or an acrylic resin.

A thickness of the light guide plate 301 is set to approximately 0.2 mm to 1.0 mm, for example, and the light guide plate 301 has a rectangular shape in cross section as viewed in the x direction. Further, on a surface of the light guide plate 301 opposite to the first main surface 301a, a second main surface 301b which is arranged parallel to the first main surface 301a and a plurality of V-shaped projecting portions 301c each of which includes inclined surfaces inclined in the projecting direction from the second main surface 301b are formed.

As shown in FIG. 1E, the respective V-shaped projecting portions 301c extend in the direction (y direction) parallel to a side surface (light incident surface) 301d of the light guide plate 301 which faces the light emitting diodes 302 in an opposed manner, and the V-shaped projecting portions 301c are arranged at predetermined intervals in the direction (x direction) orthogonal to the light incident surface 301d. That is, the V-shaped projecting portion 301c is configured to have a first inclined surface which gradually approaches the first main surface 301a corresponding to the increase of a distance from the light incident surface 301d and a second inclined surface which gradually moves away from the first main surface 301a corresponding to the increase of the distance from the light incident surface 301d.

The light guide plate 301 is made of a transparent resin, and a refractive index of the light guide plate 301 is larger than a refractive index of air. Accordingly, out of lights 5 which are incident on the light guide plate 301 from the light emitting diodes 302, a light which is incident on the first main surface 301a and the second main surface 301b at an angle larger than a specific angle (critical angle) is totally reflected on the respective main surfaces. On the other hand, a light which is incident on the first main surface 301a and the second main surface 301b at an angle smaller than the specific angle (critical angle) is refracted on the respective main surfaces and is radiated to the outside of the light guide plate 301.

A large part of the light which is incident on the light guide plate 301 has an incident angle larger than the critical angle with respect to the first main surface 301a and the second main surface 301b and propagates in the inside of the light guide plate 301 while repeating the total reflection with respect to the first main surface 301a and the second main surface 301b of the light guide plate 301. Further, when the light which advances in the inside of the light guide plate 301 while repeating the total reflection with respect to the first main surface 301a and the second main surface 301b assumes an incident angle with respect to the first main surface 301a smaller than the critical angle after being reflected on the first inclined surface of the V-shaped projecting portion 301c, the light is refracted on the first main surface 301a and is radiated to the outside of the light guide plate 301.

In such an edge-light-type backlight 3, for example, as shown in FIG. 1F, an optical sheet group 305 including optical sheets such as a prism sheet and a light diffusion sheet is arranged between the liquid crystal display panel 1 and the light guide plate 301, and a reflection sheet 306 is arranged on a back side of the light guide plate 301 as viewed from a liquid crystal display panel 1 side.

In FIG. 1F, although the light guide plate 301 has a rectangular cross-sectional shape, the cross-sectional shape of the light guide plate 301 is not limited to a rectangular shape. The light guide plate 301 may have a wedge-shaped cross section in which a thickness of the light guide plate 301 is gradually decreased corresponding to the increase of a distance from the light incident surface 301d.

Figure 2A:
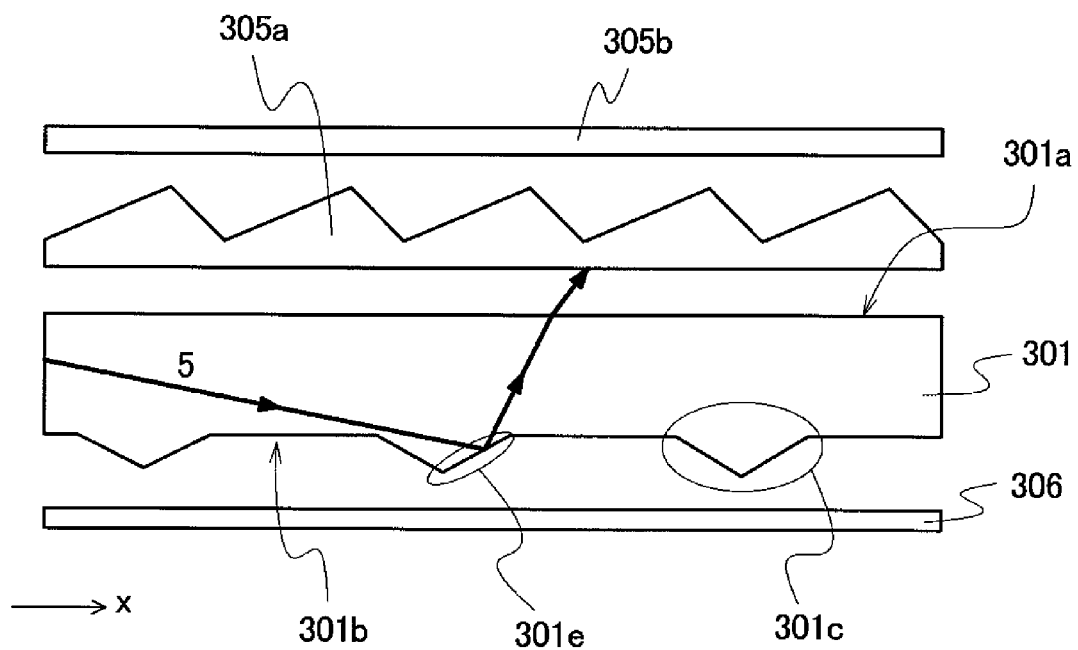
FIG. 2A is a schematic cross-sectional view showing one example of the cross-sectional constitution of the backlight.
Figure 2B:
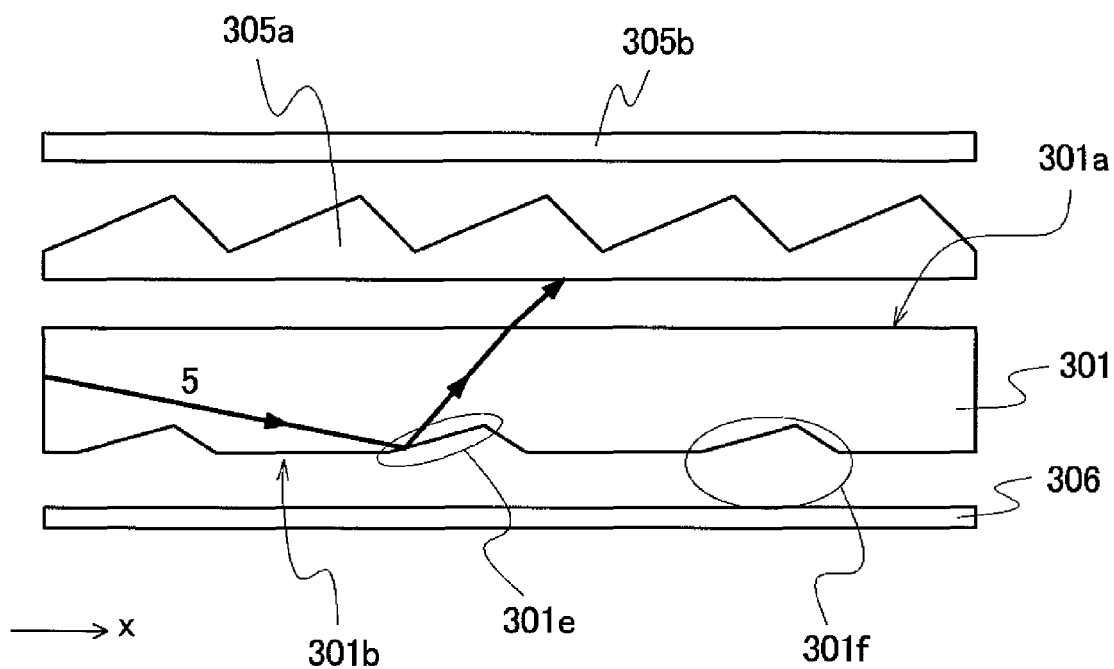
FIG. 2B is a schematic cross-sectional view showing another example of the cross-sectional constitution of the backlight.

FIG. 2A and FIG. 2B are schematic views showing the schematic constitution of the backlight according to the present invention.

FIG. 2A is a schematic cross-sectional view showing one example of the cross-sectional constitution of the backlight. FIG. 2B is a schematic cross-sectional view showing another example of the cross-sectional constitution of the backlight.

FIG. 2A is a cross-sectional view showing a portion of the cross-sectional constitution shown in FIG. 1F relating to the backlight in a partially enlarged manner. FIG. 2B is a view showing a modification of the constitution shown in FIG. 2A.

As shown in FIG. 2A, the V-shaped projecting portion 301c formed on the light guide plate 301 includes, for example, the first inclined surface 301e which changes the reflection direction of the light 5 which propagates in the inside of the light guide plate 301. The first inclined surface 301e makes an angle of 1 to 35 degrees, for example, with respect to the second main surface 301b of the light guide plate 301. Accordingly, the light 5 which is reflected on the first inclined surface 301e is incident on the first main surface 301a at a large angle with respect to the direction perpendicular to the first main surface 301a of the light guide plate 301.

When the light 5 is incident on the first main surface 301a at an angle smaller than the critical angle, the light is radiated to the outside of the light guide plate 301. The light radiated to the outside of the light guide plate 301 is radiated while spreading outwardly. Accordingly, the prism sheet 305a and the light diffusion sheet 305b are arranged between the light guide plate 301 and the liquid crystal display panel 1 so as to reflect and to refract the outgoing light toward a liquid crystal display panel (not shown in the drawing) side.

Further, to change the reflection direction of the light 5 which propagates in the inside of the light guide plate 301, for example, as shown in FIG. 2B, a V-shaped groove portion 301f having a first inclined surface 301e which is retracted in the direction toward the first main surface 301a from the second main surface 301b may be formed in the light guide plate 301. Also in this case, the light 5 which is reflected on the first inclined surface 301e is incident on the first main surface 301a at a large angle with respect to the direction perpendicular to the first main surface 301a of the light guide plate 301. Accordingly, when the light 5 is incident on the first main surface 301a at an angle smaller than the critical angle, the light 5 is radiated to the outside of the light guide plate 301. Also in this case, the light which is radiated to the outside of the light guide plate 301 is radiated while spreading outwardly and hence, the prism sheet 305a and the light diffusion sheet 305b are arranged between the light guide plate 301 and the liquid crystal display panel 1 so as to reflect and to refract the outgoing light toward a liquid crystal display panel (not shown in the drawing) side.

For example, as shown in FIG. 2A, the prism sheet 305a has prisms each of which is formed into an asymmetric cross section consisting of left and right inclined surfaces which differ from each other in length (angle). The prism sheet with the prisms having the asymmetric cross section (hereinafter referred to as an asymmetric prism sheet) 305a can, even when the light radiated from the light guide plate 301 has directivity, effectively utilize such directivity.

Here, with respect to a conventional backlight 3, it has been desired that a light radiated from the light guide plate 301 has no directivity. However, the light radiated from the light guide plate 301 having the V-shaped projecting portions 301c possesses some directivity. Accordingly, an attempt has been made by the inventors of the present invention to effectively make use of the directivity of the light radiated from the light guide plate 301 with the use of the asymmetric prism sheet 305a in place of eliminating the directivity of the light radiated from the light guide plate 301.

Further, the inventors of the present invention have found that, in such an attempt to use the asymmetric prism sheet 305a, when the asymmetric prism sheet 305a is used, contrary to the conventional constitution, by imparting directivity to a light radiated from the light guide plate 301 and by setting an angle of light which is incident on the asymmetric prism sheet 305a within a fixed range, it is possible to efficiently radiate the light to the liquid crystal panel 1.

As described above, when the incident angle with respect to the first main surface 301a becomes smaller than the critical angle, the light which propagates in the inside of the light guide plate 301 is radiated to the outside of the light guide plate 301 and hence, the light which propagates in the inside of the light guide plate 301 is reflected on the first main surface 301a and the second main surface 301b at an angle equal to or more than the critical angle. The light which is reflected in the inside of the light guide plate 301 is reflected on the first inclined surface 301e of the projecting portion 301c and hence, provided that an angle of the first inclined surface 301e is fixed, it is possible to estimate that the lights radiated from the light guide plate 301 have an equal radiation angle.

However, it is found that, even when the angles of the first inclined surfaces 301e are set equal, the distribution of angles of radiation lights changes corresponding to distances of the first inclined surfaces 301e from the light incident surface 301d of the light guide plate 301.

Figure 3B:
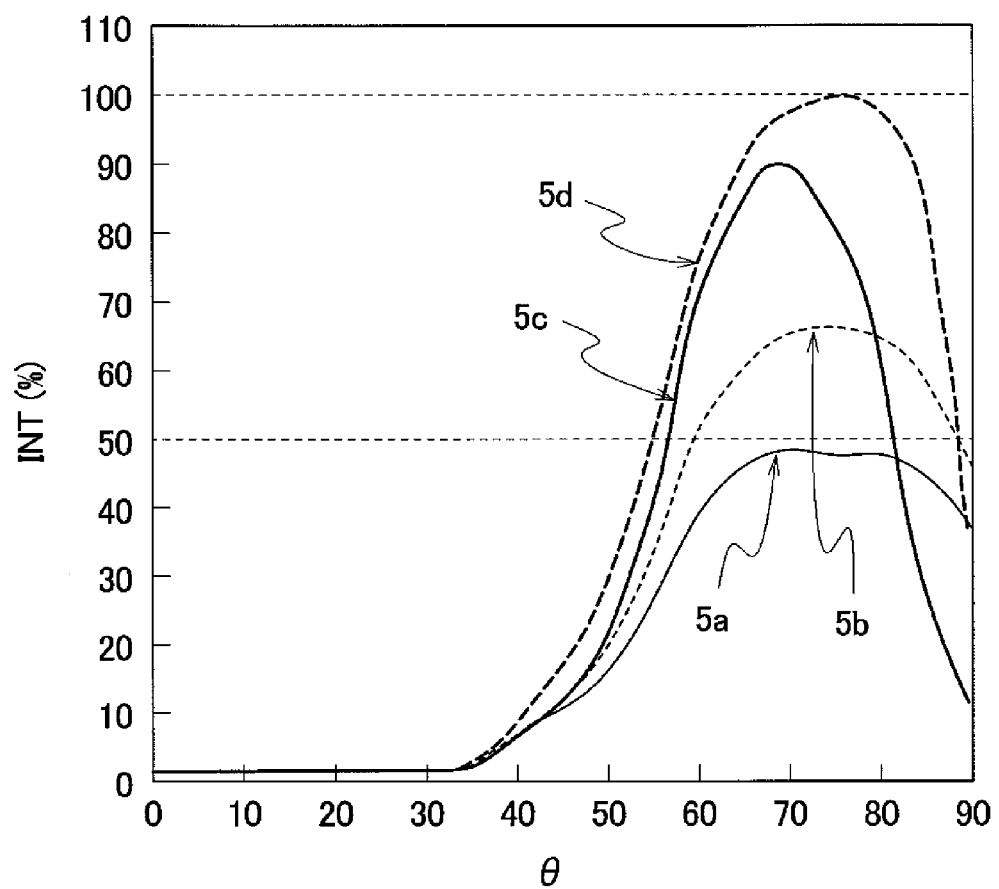
FIG. 3B is a schematic graph showing the distribution of radiation angles of lights which are radiated from four points shown in FIG. 3A.

FIG. 3A and FIG. 3B are schematic views for explaining one of the drawbacks on the backlight.

FIG. 3A is a schematic cross-sectional view showing lights radiated from four points which differ from each other in distance from the light incident surface of the light guide plate. FIG. 3B is a schematic graph showing the distribution of angles of the lights radiated from four points shown in FIG. 3A.

Here, in the graph shown in FIG. 3B, an axis of ordinates indicates a relative value of the radiation-light strength and a percentage assuming an in-plane maximum intensity of light on the light radiation surface as 100. In the graph shown in FIG. 3B, a radiation angle of the light is taken on an axis of abscissas, and the direction along which the distance is increased in the x-axis direction from the light incident surface 301$d$ is set as the positive direction.

The inventors of the present invention have investigated the relationship between the distance from the light incident surface 301$d$ of the light guide plate 301 and the distribution of the radiation-light angle when the angles of the respective first inclined surfaces 301$e$ of the light guide plate 301 are set equal with respect to lights 5$a$, 5$b$, 5$c$ and 5$d$ which are radiated from said four points shown in FIG. 3A, for example. As the result of the investigation, the inventors have obtained the relationship shown in FIG. 3B.

That is, the light 5$a$ which is radiated from a position closest to the light incident surface 301$d$ is widely distributed from 60 degrees to 85 degrees. On the other hand, the light 5$c$ which is radiated from a position remote from the light incident surface 301$d$ has a peak thereof in the vicinity of the radiation angle of approximately 70 degrees and a distribution range of the incident lights is also narrow.

This implies that, in the vicinity of the light incident surface 301$d$, the light in the inside of the light guide plate 301 is distributed at various angles although these angles are angles larger than the critical angle. Further, the distribution of angles is narrowed along with the increase of distance from the light incident surface 301$d$. This also implies that factors which deteriorate the directivity are reduced.

In view of the above, the inventors of the present invention have studied a possibility of reflecting lights which are incident on the second main surface 301$b$ at limited angles on the first inclined surface 301$e$ among lights which propagate in the inside of the light guide plate 301 such that the lights are radiated at a fixed angle irrespective of the distance from the light incident surface 301$d$. Further, the inventors of the present invention have also studied the constitution which can reduce factors which deteriorate the directivity.

FIG. 4A to FIG. 4D are schematic cross-sectional views for explaining the relationship between an angle of the inclined surface and the reflection/refraction of light on the inclined surface.

Figure 4A:
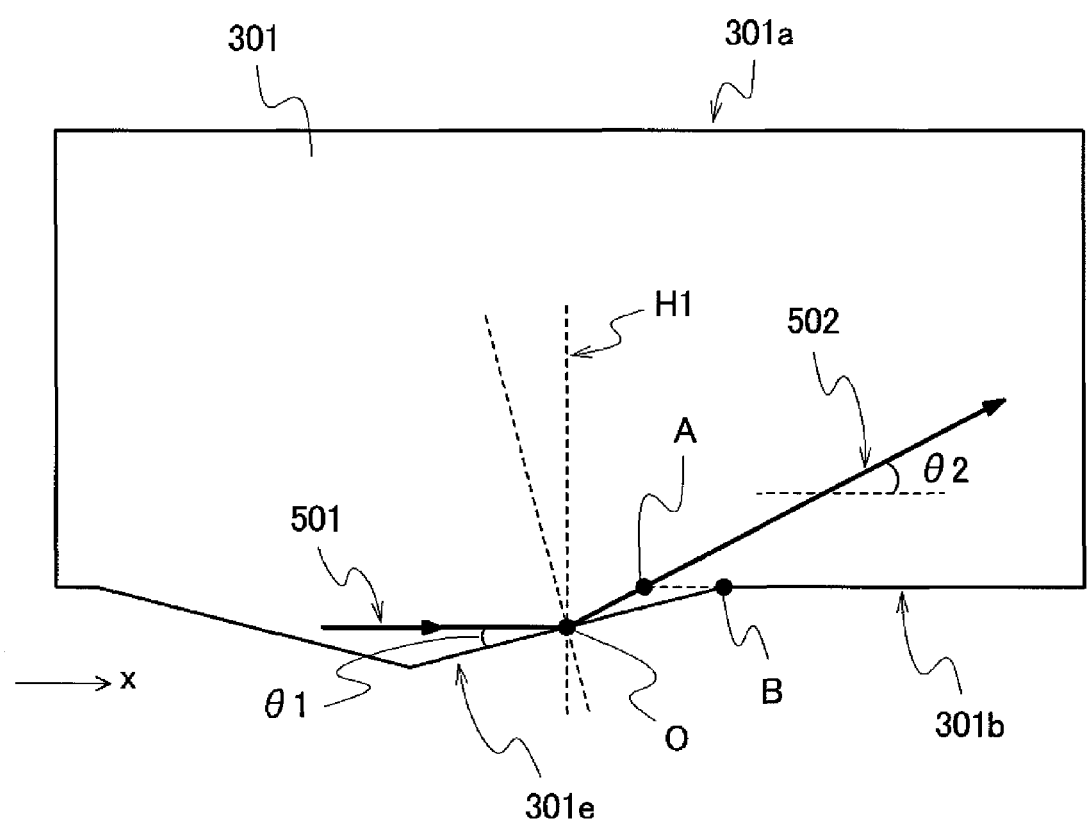
FIG. 4A is a schematic cross-sectional view showing a first pattern of reflection of light on an inclined surface.
Figure 4B:
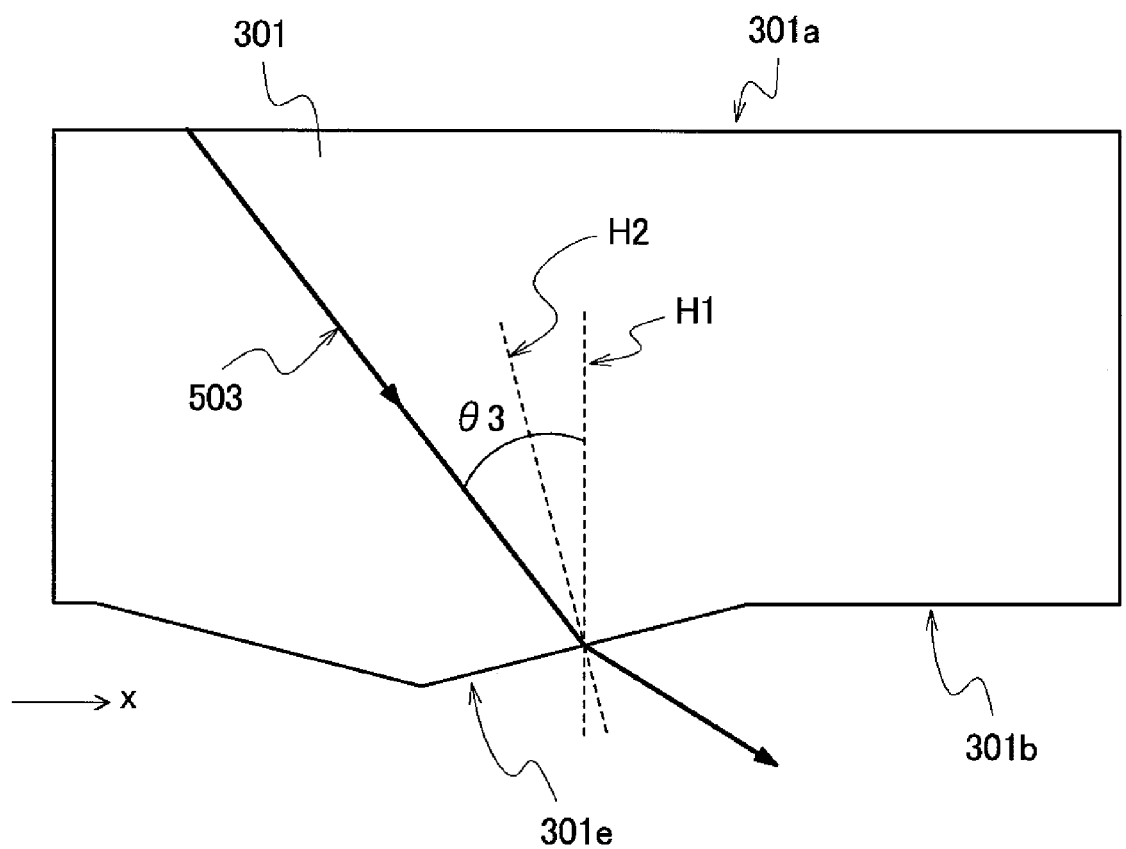
FIG. 4B is a schematic cross-sectional view showing a pattern of refraction of light on the inclined surface.
Figure 4C:
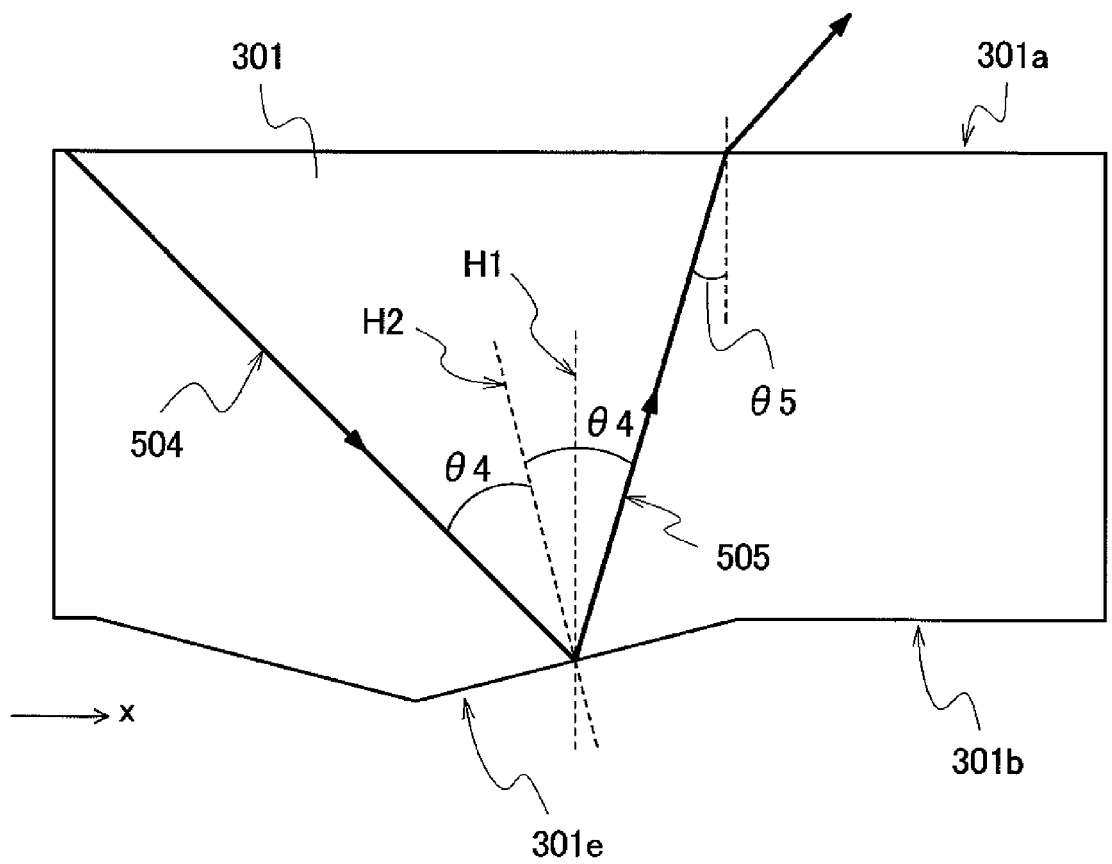
FIG. 4C is a schematic cross-sectional view showing a second pattern of reflection of light on the inclined surface.
Figure 4D:
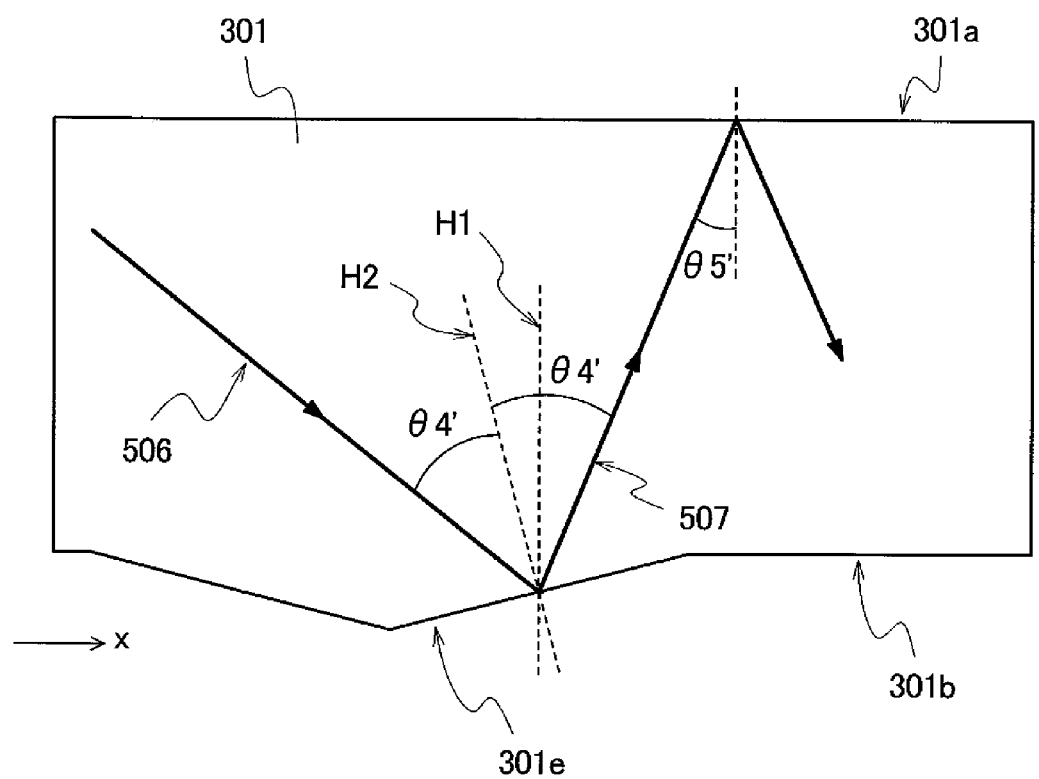
FIG. 4D is a schematic cross-sectional view showing a third pattern of reflection of light on the inclined surface.

FIG. 4A is a schematic cross-sectional view showing a first pattern of the reflection of light on the inclined surface. FIG. 4B is a schematic cross-sectional view showing a refraction pattern of light on the inclined surface. FIG. 4C is a schematic cross-sectional view showing a second pattern of the reflection of light on the inclined surface. FIG. 4D is a schematic cross-sectional view showing a third pattern of the reflection of light on the inclined surface.

With respect to the relationship between the angle of the inclined surface and the reflection/refraction of light on the inclined surface, first of all, the explanation is made with respect to an angle after reflection of light which is reflected on the first inclined surface 301$e$ which intersects the second main surface 301$b$ of the light guide plate 301 at an angle $\alpha$ in conjunction with FIG. 4A. Here, for facilitating the understanding of the relationship, it is assumed that an incident light is a light 501 which advances in the direction parallel to the second main surface 301$b$. In this case, an angle $\theta$1 made by the first inclined surface 301$e$ and the incident light 501 becomes $\alpha$. The light 501 is reflected at a point O on the first inclined surface 301$e$ and becomes a reflection light 502. Since an angle AOB and an angle OBA of a triangle OAB are $\alpha$ respectively, an angle $\theta$2 made by the reflection light 502 and the second main surface 301$b$ is 2$\alpha$.

In this manner, when the angle made by the first inclined surface 301$e$ and the second main surface 301$b$ is $\alpha$, the light 502 which is reflected on the first inclined surface 301$e$ is reflected at an angle which is increased by an amount of 2$\alpha$ with respect to the second main surface 301$b$. To the contrary, the light 502 is reflected at an angle which is decreased by an amount of 2$\alpha$ with respect to a normal line H1 of the second main surface 301$b$.

Next, as shown in FIG. 4B, the explanation is made with respect to a case in which a light which is incident on the second main surface 301$b$ at the critical angle is incident on the first inclined surface 301$e$. An incident light 503 which makes an angle $\theta$3 with respect to the normal line H1 of the second main surface 301$b$ is a light of a critical angle. Here, assuming that the first inclined surface 301$e$ is inclined at an angle $\alpha$ with respect to the second main surface 301$b$, an angle made by the incident light 503 and a normal line H2 of the first inclined surface 301$e$ is decreased from the critical angle by an amount of $\alpha$. Accordingly, the incident light 503 is refracted on the first inclined surface 301$e$ and is radiated to the outside of the light guide plate 301.

That is, when the angle made by the first inclined surface 301$e$ and the second main surface 301$b$ is $\alpha$, a light having the angle $\theta$3 with respect to the normal line H1 of the second main surface 301$b$ which falls within a range from the critical angle to an angle made by adding $\alpha$ to the critical angle is radiated to the outside of the light guide plate from the first inclined surface 301$e$.

Next, as shown in FIG. 4C, considered is an incident light 504 having an angle with respect to the normal line H1 of the second main surface 301$b$ which falls within a range from the critical angle to an angle made by adding $\alpha$ to the critical angle. Since the first inclined surface 301$e$ is inclined at an angle $\alpha$ with respect to the second main surface 301$b$, an incident angle $\theta$4 of the incident light 504 with respect to the first inclined surface 301$e$ becomes a critical angle. Further, a light having an incident angle larger than the incident angle of the incident light 504 is totally reflected on the first inclined surface 301$e$ and advances toward the first main surface 301$a$.

Here, when the light 504 which makes an angle made by adding the angle $\alpha$ to the critical angle with respect to the normal line H1 is reflected on the first inclined surface 301$e$, a reflection light 505 is reflected at an angle made by adding an angle 2$\alpha$ to the critical angle with respect to the second main surface 301$b$. Accordingly, the light which is incident at an angle made by adding the angle $\alpha$ to the critical angle with respect to the normal line H1 is reflected at an angle made by subtracting an angle $\alpha$ from the critical angle with respect to the normal line H1.

Accordingly, an incident angle $\theta$5 of the reflection light 505 at which the reflection light 505 is incident on the first main surface 301$a$ becomes an angle made by subtracting an angle $\alpha$ from the critical angle, and the reflection light 505 is refracted on the first main surface 301$a$ and is radiated to the outside of the light guide plate 301. In this manner, a light which is incident on the first inclined surface 301$e$ at an angle which falls within a range from an angle made by adding an angle $\alpha$ to the critical angle with respect to the normal line H1 to an angle made by adding an angle 2$\alpha$ to the critical angle with respect to the normal line H1 becomes a light 505 which makes an angle smaller than a critical angle with respect to the normal line H3 of the first main surface 301$a$, and the light 505 is radiated to the outside of the light guide plate 301 from the first main surface 301$a$.

Finally, as shown in FIG. 4D, a case in which the reflection light which is reflected on the first inclined surface 301e is also reflected on the first main surface 301a is explained. When a light 506 which makes an angle made by adding the angle 2α to the critical angle or more with respect to the normal line H1 is incident on the first inclined surface 301e, an incident angle θ4' assumes an angle made by adding an angle α to the critical angle or more. Accordingly, an incident angle θ5' of a reflection light 507 which is reflected on the first inclined surface 301e with respect to the first main surface 301a and is incident on the first main surface 301a becomes a critical angle or more, and the reflection light 507 is reflected on the first main surface 301a. Here, the incident angle θ5' at this point of time is an angle after the reflection of the light on the first inclined surface 301e and hence, the incident angle θ5' is decreased from the incident angle of the light to the first main surface 301a before the reflection of the light on the first inclined surface 301e by an angle 2α.

Figure 5A:
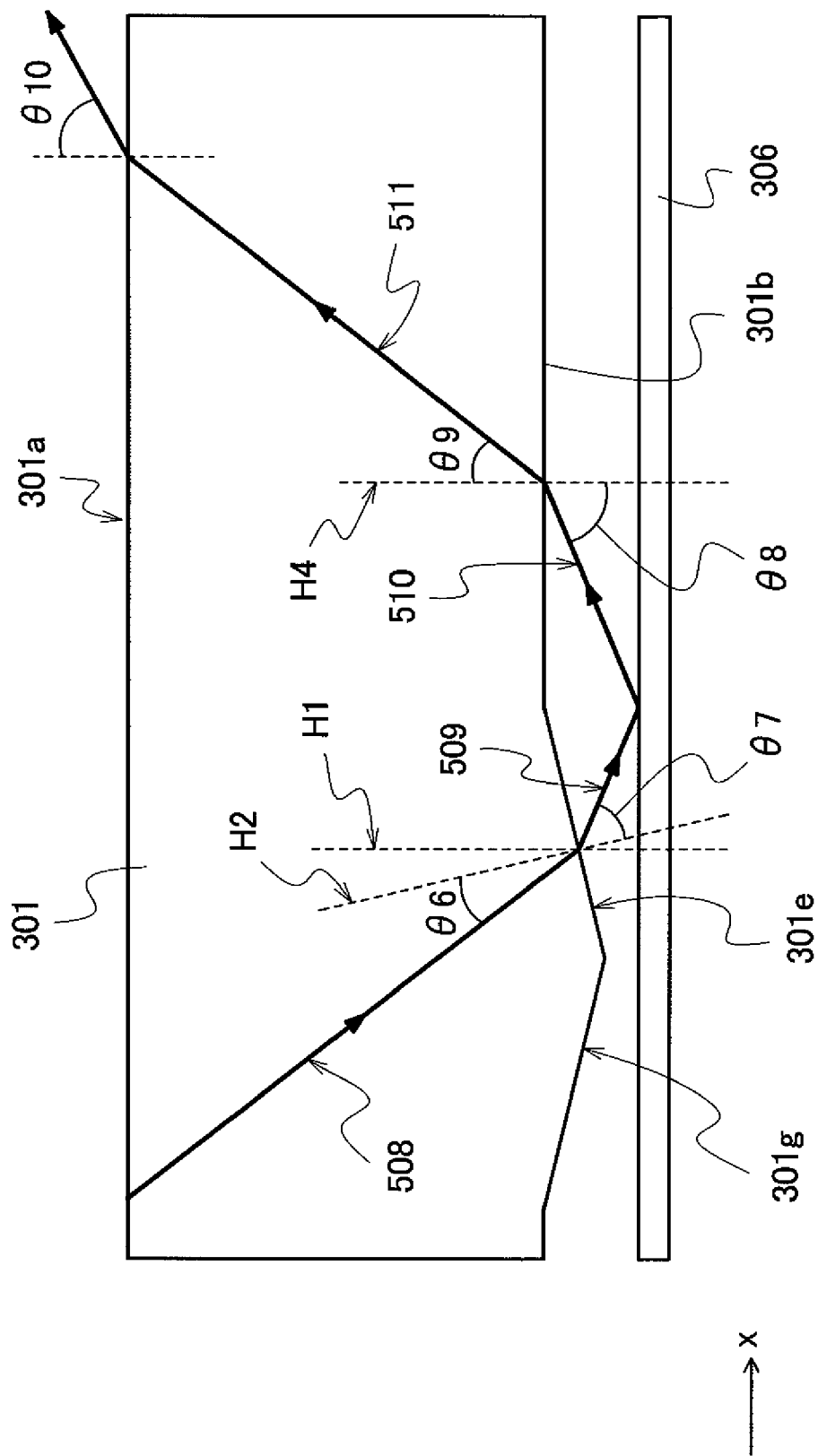
FIG. 5A is a schematic cross-sectional view showing one example of a transmission path of light when light radiated from the inclined surface of the light guide plate returns to the inside of the light guide plate again.

FIG. 5A and FIG. 5B are schematic views for explaining one of reasons which produces the distribution of radiation angle of a light radiated from the light guide plate.

FIG. 5A is a schematic cross-sectional view showing one example of a transmission path of a light when the light radiated from the inclined surface of the light guide plate returns to the inside of the light guide plate again. FIG. 5B is a schematic cross-sectional view showing one example of a transmission path of a light when the light reflected on the inclined surface of the light guide plate is radiated from the first main surface.

When the light guide plate 301 is made of a polycarbonate resin which exhibits a refraction index of 1.59, a critical angle of is set to 38.97 degrees.

For enhancing the directivity of a light radiated from the light guide plate 301, by setting an angle made by the first inclined surface 301e and the second main surface to a small value as much as possible, that is, by setting an angle α made by the first inclined surface 301e and the second main surface 301b to 1 degree, the following can be mentioned.

First of all, the explanation is made with respect to a case in which a light which is incident on the second main surface 301b at a critical angle is used as a light which is radiated from the first inclined surface 301e. Here, an angle made by the first inclined surface 301e and the second main surface 301b assumes 1 degree and hence, as shown in FIG. 5B, an angle θ6 made by an incident light 508 and the normal line H2 of the first inclined surface 301e becomes 37.97 degrees. That is, since the incident light 508 is incident on the first inclined surface 301e at an angle smaller than the critical angle of 38.97 degrees, the incident light 508 is refracted on the first inclined surface 301e and is radiated to the outside of the light guide plate 301. Here, a radiation angle θ7 of a light 509 radiated from the first inclined surface 301e with respect to a normal line H2 becomes 78.03 degrees based on the Snell's law.

A light 509 which is radiated from the light guide plate 120 is reflected on the reflection sheet 306, and is again incident on the light guide plate 301. Here, an incident angle θ8 of the light 510 which is again incident on the light guide plate 301 made with respect to the second main surface 301b is increased by an angle corresponding to the inclination of the first inclined surface 301e, and the incident angle θ8 assumes 79.03 degrees.

An incident angle θ9 of a light 511 which is again incident on the light guide plate 301 with respect to a normal line H4 of the second main surface 301b becomes 38.13 degrees based on the Snell's law. Further, the light 511 is also incident at an angle of 38.13 degrees with respect to the first main surface 301a parallel to the second main surface 301b. That is, the light 511 which is again incident on the light guide plate 301 makes an incident angle with respect to the first main surface 301a smaller than the critical angle of 38.97 degrees and hence, the light 511 is refracted on the first main surface 301a and is radiated from the first main surface 301a. Here, a radiation angle θ10 of the light radiated from the first main surface 301a becomes 79.03 degrees based on the Snell's law.

It is considered that, in the inside of the light guide plate 301, a light which makes an angle with respect to the normal line H1 smaller than the critical angle of 38.97 degrees is radiated from the light guide plate 301. Accordingly, in a case in which an angle made by the first inclined surface 301e and the second main surface 301b assumes 1 degree, it is considered that a light radiated from the first inclined surface 301e is a light which makes a critical angle ranging from an angle of 38.97 degrees to an angle of 39.97 degrees with respect to the normal line H1.

Next, the explanation is made with respect to a case in which an angle which a line makes with respect to the normal line H1 is set to a value slightly smaller than the critical angle of 39.97 degrees. In this case, although a radiation angle θ7 with respect to the normal line H2 approximates the direction parallel to the first inclined surface 301e as much as possible, the radiation light 509 makes a finite angle with respect to the reflection sheet 306 and hence, the light 509 is incident on the light guide plate 301 again after being reflected on the reflection sheet 306.

Here, with respect to the light 511 which is incident on the light guide plate 301 again, the light 511 is incident on the first main surface 301a at the same angle as the angle θ9 at which the light 511 is incident on the light guide plate 301, is refracted on the first main surface 301a, and is radiated from the first main surface 301a. Accordingly, the light which is incident on the light guide plate 301 at an angle which is substantially parallel to the second main surface 301b becomes a light which advances in the direction substantially parallel to the first main surface 301a.

Here, when the angle of the first inclined surface 301e is 2 degrees, the incident angle θ8 at which the light 510 is again incident on the light guide plate 301 after being radiated from the first inclined surface 301e and being reflected on the reflection sheet 306 is increased by an angle corresponding to the inclination of the first inclined surface 301e and hence, the light 510 is incident on the second main surface 301b at an angle of approximately 75.0 degrees. Accordingly, the radiation angle θ10 at which the light 511 which is again incident on the light guide plate 301 is radiated from the first main surface 301a assumes the distribution of angle ranging from 75 degrees to 90 degrees. Accordingly, it is understood that the distribution of angle is widened along with the increase of the inclination of the first inclined surface 301e. Further, out of the lights 509 which are radiated from the first inclined surface 301e, the light which is substantially parallel to the first inclined surface 301e is incident on the light guide plate 301 from the second inclined surface 301g and becomes a cause which deteriorates the directivity of the light which is radiated from the first main surface 301a.

Next, a light which is reflected on the first inclined surface 301e and is radiated from the first main surface 301a is explained in conjunction with FIG. 5B. Firstly, as an angle of a boundary which prevents the radiation of light on the first inclined surface 301e, an incident light 512 which makes an angle of 39.97 degrees with respect to the normal line H1 is explained. In this case, an angle θ11 made by the light 512 and the normal line H2 of the first inclined surface 301e becomes 38.97 degrees.

As described above, an angle θ12 made by the light 513 which is reflected on the first inclined surface 301e and the normal line H1 is decreased by 2 degrees and hence, the angle θ12 becomes 37.97 degrees. Accordingly, an incident angle θ13 of the reflection light 513 with respect to the first main surface 301a becomes 37.97 degrees, and a radiation angle θ14 of the radiation light becomes 78.02 degrees based on the Snell's law.

Next, as an angle of boundary which prevents the radiation of the reflection light 513 from the first main surface 301a, the incident light 512 which makes an angle of 40.97 degrees with respect to the normal line H1 is explained. In this case, an incident angle θ13 of the reflection light 513 made with respect to the first main surface 301a is, as described above, decreased by an angle twice as large as the angle of the first inclined surface 301e and hence, the incident angle θ13 becomes 38.97 degrees. Here, the radiation angle θ14 of the light radiated from the first main surface 301a becomes approximately 90 degrees based on the Snell's law.

From the above-mentioned explanation, when the light guide plate 301 is made of a polycarbonate resin having a refraction index of 1.59 and the angle made by the first inclined surface 301e and the second main surface 301b is set to 1 degree, it is understood that the light radiated from the first main surface 301a of the light guide plate 301 exhibits an angle characteristic in which an angle of the light with respect to the normal direction of the first main surface 301a is distributed within a range from 78.02 degrees to 90 degrees. In this manner, it is understood that, to prevent the spreading of the distribution of light radiated from the first main surface 301a, it is necessary to make the angle of the first inclined surface 301e as small as possible.

To decrease the above-mentioned drawback that the distribution of lights radiated from the first main surface 301a is spread due to the lights radiated from the first inclined surface 301e, it is necessary to make the angle of the first inclined surface 301e as small as possible and, at the same time, it is necessary to make an area of another inclined surface 301g as small as possible. Further, in the constitution which makes the angle of the first inclined surface 301e as small as possible, the number of times that the light is reflected in the inside of the light guide plate 301 is one time in many cases and hence, it is possible to obtain the radiated lights whose polarization directions are set equal to each other.

Next, a case in which the light guide plate 301 is made of an acrylic resin which exhibits a refraction index of 1.53 is explained. Here, a critical angle is set to 40.81 degrees. Further, an angle made by the first inclined surface 301e and the second main surface 301b is set to 1 degree in the same manner.

First of all, as shown in FIG. 5A, as a light radiated from the first inclined surface 301e, a light 508 which is incident on the second main surface 301b at a critical angle is explained. An angle θ6 which is made by the incident light 508 and the normal line H2 of the first inclined surface 301e becomes 39.81 degrees. In this case, a radiation angle θ7 of the light 509 radiated from the first inclined surface 301e becomes 78.40 degrees based on the Snell's law.

When the light 509 which is radiated from the first inclined surface 301e is reflected on the reflection sheet 306, and is again incident on the light guide plate 301, an incident angle θ8 of the light 510 with respect to the second main surface 301b is increased by an angle corresponding to the inclination of the first inclined surface 301e so that the incident angle θ8 assumes 79.40 degrees.

An incident angle θ9 of a light 511 which is again incident on the light guide plate 301 made with respect to a normal line H4 of the second main surface 301b becomes 39.97 degrees based on the Snell's law. Further, the light 511 is also incident on the first main surface 301a parallel to the second main surface 301b at an angle of 39.97 degrees. That is, the incident angle of the light 511 with respect to the first main surface 301a becomes larger than a critical angle of 38.97 degrees and hence, the light 511 is refracted on the first main surface 301a and is radiated from the first main surface 301a. Here, a radiation angle θ10 of the light radiated from the first main surface 301a becomes 79.40 degrees based on the Snell's law. Accordingly, when the light radiated from the first inclined surface 301e is again incident on the light guide plate 301 and is radiated from the first main surface 301a, an angle of the light made with respect to the normal direction of the first main surface 301a is distributed within a range from 79.40 degrees to 90 degrees.

Next, a light which is reflected on the first inclined surface 301e and is radiated from the first main surface 301a is explained in conjunction with FIG. 5B. Firstly, as an angle of a boundary which prevents the radiation of light on the first inclined surface 301e, an incident light 512 which makes an angle of 41.81 degrees with respect to the normal line H1 is explained. In this case, an angle made by the light 513 which is reflected on the first inclined surface 301e and the first main surface 301a is decreased by an angle twice as large as an angle of the first inclined surface 301e and hence, the angle becomes 39.81 degrees. Here, a radiation angle of radiation light becomes 78.40 degrees based on the Snell's law.

Next, as an angle of boundary which prevents the radiation of the reflection light 513 from the first main surface 301a, the incident light 512 which makes an angle of 42.81 degrees with respect to the normal line H1 is explained. In this case, an incident angle θ13 of the reflection light 513 made with respect to the first main surface 301a is, as described above, decreased by an angle twice as large as an angle of the first inclined surface 301e and hence, the incident angle θ13 becomes 40.81 degrees. Further, the radiation angle θ14 of the light radiated from the first main surface 301a becomes approximately 90 degrees based on the Snell's law. Accordingly, when the light 513 reflected on the first inclined surface 301e is radiated from the first main surface 301a, an angle of the radiated light made with respect to the normal direction of the first main surface 301a is distributed within a range from 78.40 degrees to 90 degrees.

In this manner, when the light guide plate 301 is made of the acrylic resin which exhibits the refraction index of 1.53, the light radiated from the first main surface 301a has the angle dependence that the angle of the light is distributed within a range from 78.40 degrees to 90 degrees. Accordingly, compared with the case in which the light guide plate 301 is made of a polycarbonate resin which exhibits the refraction index of 1.59 and the angle of the light is distributed within a range from 78.02 degrees to 90 degrees, the light guide plate 301 made of the acrylic resin which exhibits the refraction index of 1.53 has a narrow distribution range.

FIG. 6A and FIG. 6B are schematic views showing the schematic constitution of a backlight according to the present invention, wherein FIG. 6A is a schematic cross-sectional view showing one example of the cross-sectional constitution of the backlight, and FIG. 6B is a schematic cross-sectional view showing one example of the manner of operation and advantageous effects of the backlight.

To recapitulate the above-mentioned drawback, the light radiated from the first inclined surface 301e is again incident on the light guide plate 301, and the light which is again incident on the light guide plate 301 is radiated from the first main surface 301a and hence, the distribution of lights radiated from the first main surface 301a spreads. As a method for decreasing this drawback, the inventors of the present invention have found a method which makes the angle of the first inclined surface 301e on which a light which propagates in the inside of the light guide plate 301 is incident as small as possible as shown in FIG. 6A, for example, and, at the same time, makes an area of another inclined surface 301g (second inclined surface) as small as possible. Here, a projecting portion 301c of the light guide plate 301 is configured such that an angle θ15 which is made by the first inclined surface 301e and the second main surface 301b is set to 1 degree, and an area of the second inclined surface 301g is set to one/tenth or less of an area of the first inclined surface 301e.

When the distribution of angles of lights radiated from the first main surface 301a of the light guide plate 301 having the above-mentioned constitution is measured, it is possible to obtain the measurement data that all lights radiated from respective points exhibits peaks within a range of angle from 70 degrees to 80 degrees and exhibit narrow distribution widths. That is, for example, as shown in FIG. 6B, with respect to lights 5a, 5b, 5c, 5d which are radiated from the light guide plate 301 at four positions, when angles of the respective first inclined surfaces 301e of the light guide plate 301 are set to the same angle of 1 degree, the distribution of radiation angles θ of the respective lights 5a, 5b, 5c, 5d becomes substantially equal and, at the same time, a distribution width becomes narrow. Further, it is possible to obtain the radiation lights having the equal polarization direction.

Although the backlight 3 can make the distribution of radiation angles of lights radiated from the respective points of the light guide plate 301 uniform, there exists a drawback that intensity of the light 5a which is radiated at a position closer to the light incident surface 301d becomes lower than intensities of the lights 5b, 5c, 5d which are radiated at other positions.

Figure 7A:
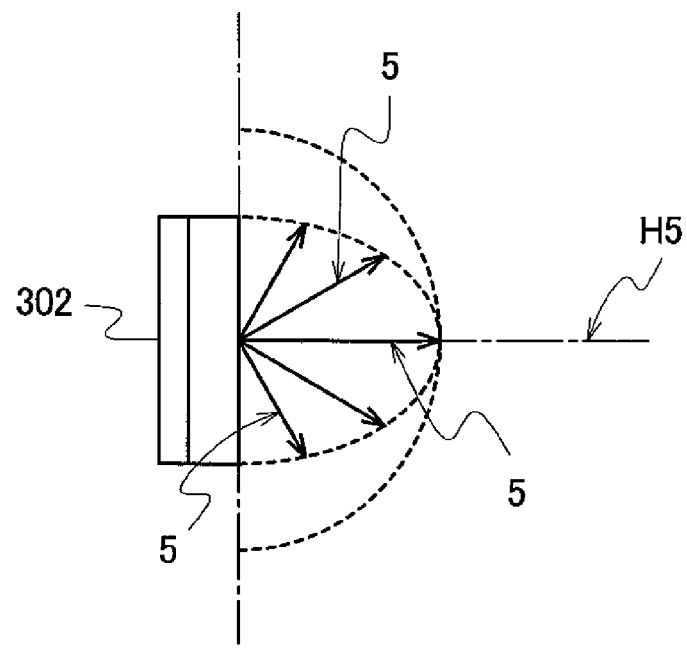
FIG. 7A is a schematic view showing one example of the radiation direction of light radiated from the light emitting diode.
Figure 7B:
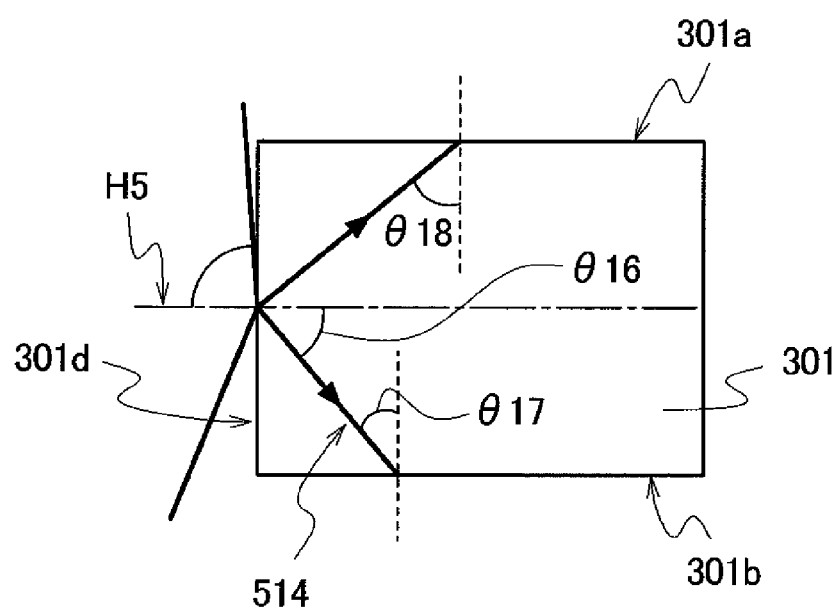
FIG. 7B is a schematic view showing one example of a light incident state on a light incident surface of the light guide plate.
Figure 7C:
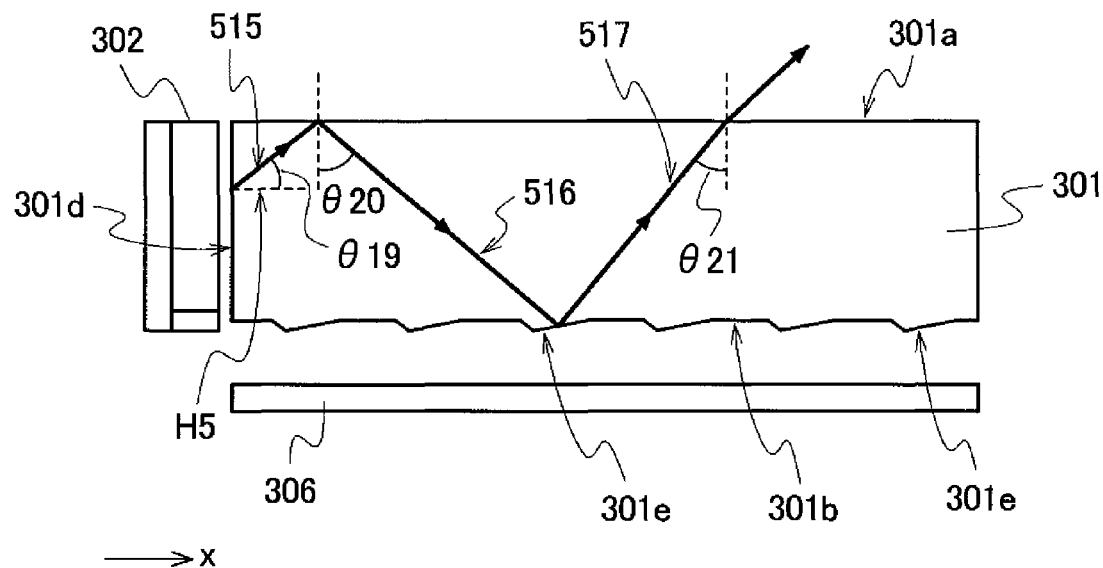
FIG. 7C is a schematic cross-sectional view showing one example of a transmission path of light in the vicinity of the light incident surface of the light guide plate.

FIG. 7A to FIG. 7C are schematic views for explaining one example of a cause of the drawback on the backlight.

FIG. 7A is a schematic view showing one example of the radiation direction of light radiated from a light emitting diode. FIG. 7B is a schematic view showing one example of the manner of incidence of light on a light incident surface of a light guide plate. FIG. 7C is a schematic cross-sectional view showing one example of a transmission path of light in the vicinity of the light incident surface of the light guide plate.

The light 5 radiated from the light emitting diode 302 is ideally considered, for example, as a light having uniformly spreading intensity within a range of angle from −90 degrees to 90 degrees with respect to a normal line H5 of the light incident surface 301d as shown in FIG. 7A.

However, when a refractive index of the light guide plate 301 is 1.53, for example, as shown in FIG. 7B, a light 514 which is incident on the light incident surface 301d at an approximately 90 degrees with respect to the normal line H5 of the light incident surface 301d becomes the light having an angle θ16 of 40.81 degrees in the inside of the light guide plate 301 based on the Snell's law. Accordingly, incident angle θ17, θ18 of the light incident from the light incident surface 301d with respect to the first main surface 301a or the second main surface 301b becomes an angle of 49.19 degrees or less.

Accordingly, for example, as shown in FIG. 7C, when an angle θ19 of the light 515 which is incident from the light incident surface 301d with respect to the normal line H5 is 41 degrees, an incident angle θ20 of the light 515 with respect to the first main surface 301a becomes 49 degrees and hence, the light 515 is reflected. Subsequently, even when the reflection light 516 is reflected on the first inclined surface 301e having the angle of 1 degree, the incident angle θ21 at which the reflection light 517 is incident on the first main surface 301a becomes acuter by merely 2 degrees (becomes 47 degrees) and hence, the angle does not exceed a critical angle of 40.81 degrees. That is, when the angle becomes acuter by 2 degrees for every reflection on the first inclined surface 301e, it is necessary to perform the reflection of light five times or more to exceed the critical angle 40.81 degrees. Accordingly, when the angle of the first inclined surface 301e is 1 degree, in the vicinity of the light incident surface 301d, there arises a drawback that light radiated from the first main surface 301a is extremely decreased.

Figure 8:
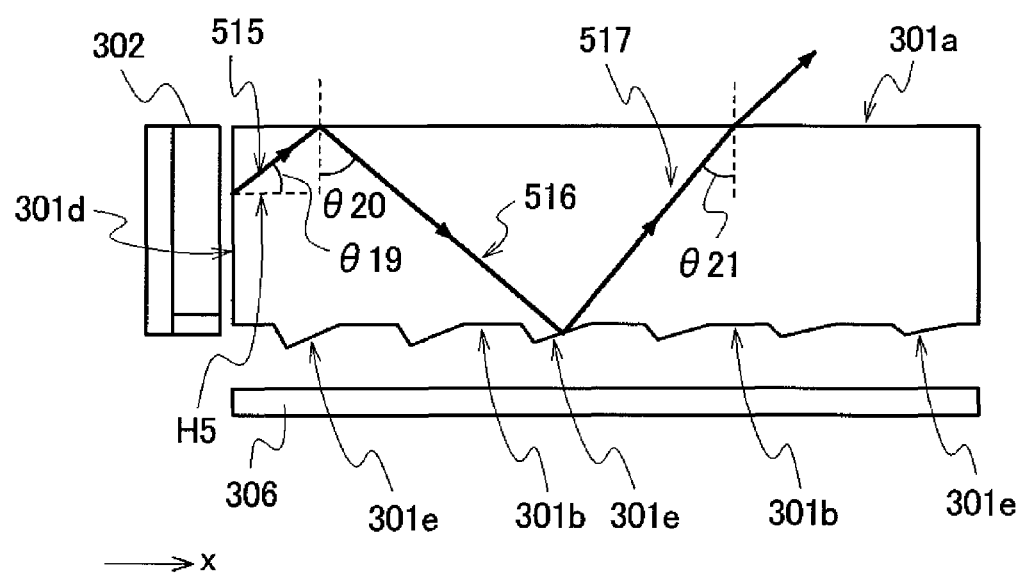
FIG. 8 is a schematic cross-sectional view showing one example of the schematic constitution of the light guide plate of the backlight.
Figure 9:
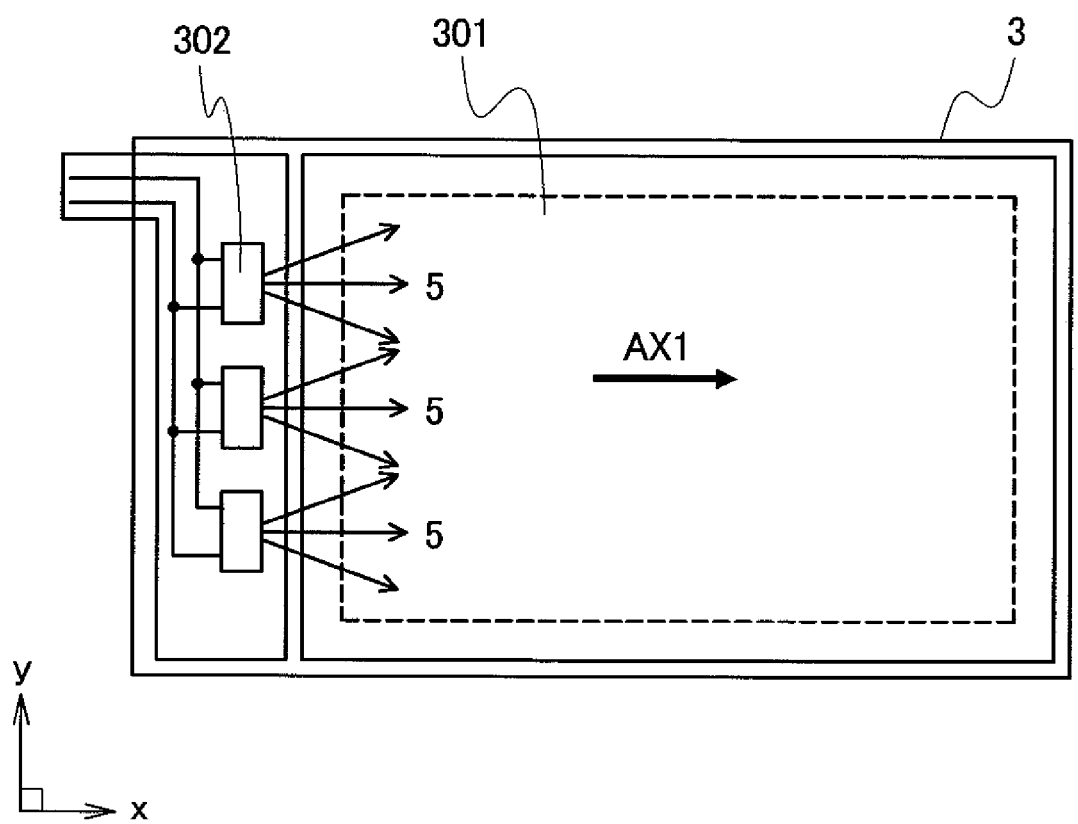
FIG. 9 is a schematic view showing one example of polarization direction generated on the backlight.
Figure 10:
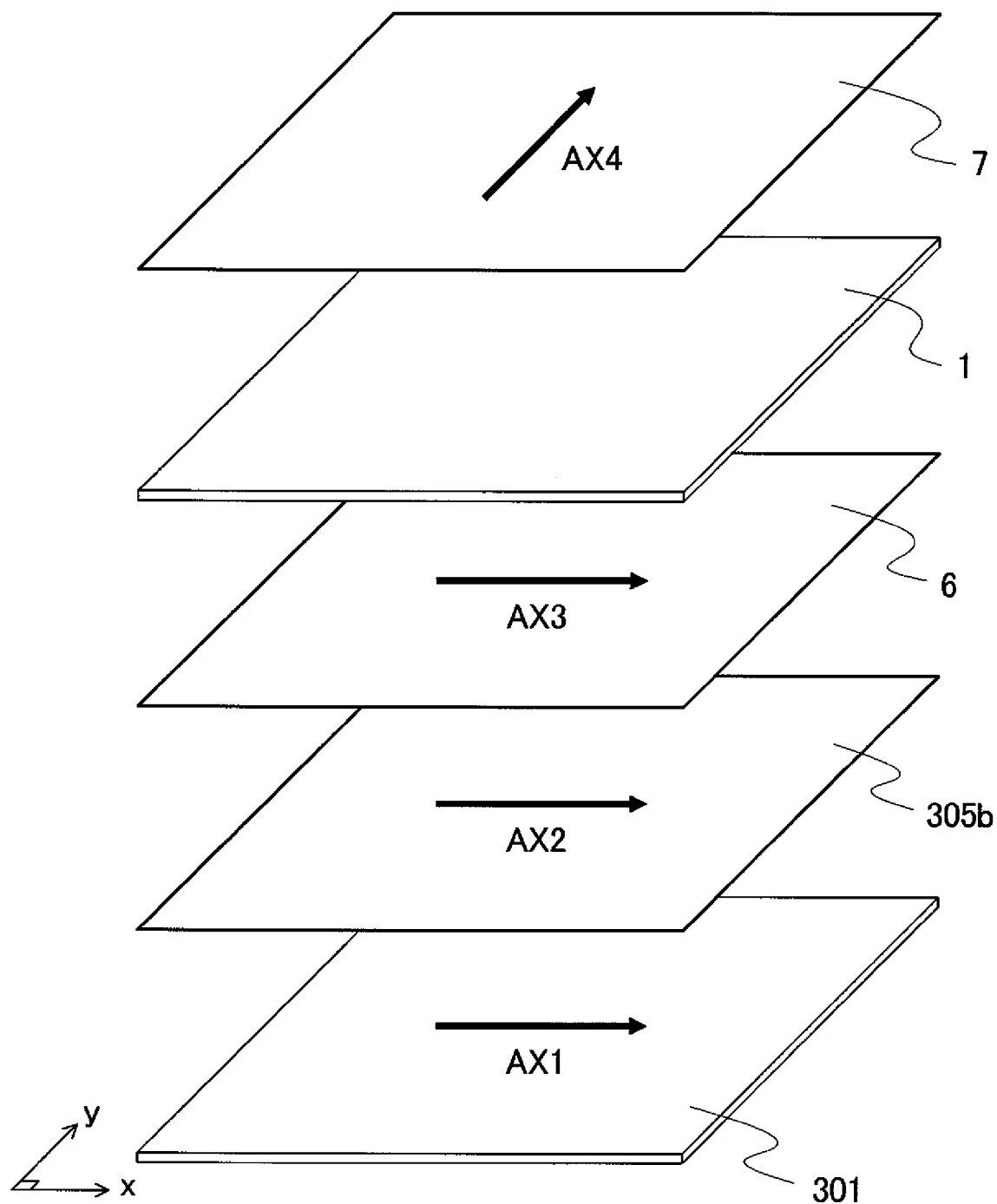
FIG. 10 is a schematic view showing one example of combination of the backlight and the liquid crystal display panel.

FIG. 8 to FIG. 10 are schematic views showing one example of the schematic constitution of the backlight according to the present invention.

FIG. 8 is a schematic cross-sectional view showing one example of the schematic constitution of the light guide plate in the backlight. FIG. 9 is a schematic view showing one example of polarization direction generated in the backlight. FIG. 10 is a schematic view showing one example of combination of the backlight and the liquid crystal display panel.

Inventors of the present invention have extensively studied the drawback on the backlight and have found that the drawback can be overcome by allowing the light guide plate 301 to have the constitution shown in FIG. 8, for example.

That is, an angle made by the first inclined surface 301e and the second main surface 301b is increased in the vicinity of the light incident surface 301d so as to become an angle which allows an incident angle of the light 517 with respect to the first main surface 301a exceeds a critical angle by mere one-time or two-time reflection of the light 517 on the first inclined surface 301e. Here, when the light guide plate 301 is formed using an acrylic resin having refractive index of 1.53, the angle of the first inclined surface 301e in the vicinity of the light incident surface 301d is set to an angle of 4 degree or more due to a calculation (49 degrees−40 degrees)/2=4.5).

Here, in a main portion of the light guide plate 301, an angle made by the first inclined surface 301e and the second main surface is set to an angle of (90 degrees−critical angle)−critical angle)/2 or less and, at the same time, an area of the first inclined surface 301e which reflects light is set larger than an area of the second inclined surface 301g so as to retain the distribution of angle of the light radiated from the first main surface 301a of the light guide plate 301 within a narrow range. Further, in the vicinity of the light incident surface 301d of the light guide plate 301, to increase the intensity of the radiated light, the angle of the first inclined surface 301e is set to an angle of (90 degrees−critical angle)−critical angle)/2 or more.

By allowing the light guide plate 301 to have the above-mentioned constitution, it is possible to obtain the light guide plate 301 which can fully make use of the performance of the asymmetric prism sheet 305a. Accordingly, the backlight of this embodiment can make the surface brightness of light uniform. Further, a rate of light which is reflected one time and is radiated is increased also in the vicinity of the light incident surface 301d and hence, it is possible to obtain the radiation lights whose polarization directions are set uniform.

As shown in FIG. 7B, the light incident into the inside of the light guide plate 301 has the distribution of angle. When the light guide plate 301 is formed using a polycarbonate resin having a refractive index of 1.59, the critical angle is 38.97 degrees, while when the light guide plate 301 is formed using an acrylic resin having a refractive index of 1.53, the critical angle is 40.81 degrees so that the distribution range is narrowed.

In this manner, with respect to the light guide plate in which the distribution of angle of the radiated light is narrow and the light is radiated in the specific direction, a rate of lights which reflect one time in the inside of the light guide plate 301 and are radiated from the light guide plate 301 is increased. Accordingly, as shown in FIG. 9, there may be a case that the polarization direction AX1 of the lights radiated from the light guide plate 301 becomes conspicuous in the x direction. In this case, the utilization efficiency of lights is improved by setting the polarization direction of the lights in the light guide plate 301 equal to the polarization direction of other optical sheets 305.

That is, the light which is incident on the light guide plate 301 passes through the light incident surface 301d and hence, it is considered that a rate of s-polarized light is large. Assuming that the s-polarized light is radiated via one-time reflection in the inside of the light guide plate 301, the radiation light becomes p-polarized light. Accordingly, by allowing the light guide plate 301 to have the constitution of the present invention, it is possible to form the light radiated from the light guide plate 301 into the lights in which the p-polarized lights are set equal to each other with respect to the x direction shown in FIG. 9, for example.

As shown in FIG. 10, when the polarization direction AX1 of the light which is radiated from the light guide plate 301 becomes conspicuous in the x direction, by setting the polarization direction AX1 of the light guide plate 301, the polarization direction AX2 of the optical diffusion sheet 305b and the polarization direction AX3 of the polarizer 6 arranged on a light guide plate 301 side of the liquid crystal display panel 1 equal to each other, it is possible to efficiently radiate the light radiated from the light guide plate 301 to the liquid crystal display panel 1. Here, the polarization direction AX4 of another polarizer 7 which is arranged with the liquid crystal display panel 1 sandwiched between the polarizers 6,7 is set orthogonal to the polarization direction AX1.

Although the present invention has been explained specifically in conjunction with the above-mentioned embodiments, it is needless to say that the present invention is not limited to the above-mentioned embodiments, and various modifications of the present invention can be made without departing from the gist of the present invention.

For example, in the above-mentioned embodiment, the light guide plate 301 in which the first inclined surface 301e projects from the second main surface 301b is exemplified. However, it is needless to say that the present invention is not limited to such a case, and is applicable to a light guide plate 301 having a V-shaped groove portion 301f in which a first inclined surface 301e retracts toward a first main surface 301a side from a second main surface 301b side.

What is claimed is:

1. A liquid crystal display device comprising:
a liquid crystal display panel; and
a backlight which radiates lights to the liquid crystal display panel, wherein
the backlight includes a light guide plate and a light source arranged on an outer peripheral portion of the light guide plate, and a light diffusion sheet which is arranged between the light guide plate and the liquid crystal display panel,
the light guide plate is made of a transparent plastic resin having a refractive index of 1.53 or less,
the light guide plate has a first main surface and a second main surface which faces the first main surface in an opposed manner,
the first main surface of the light guide plate is disposed at a position which is closer to the liquid crystal display panel than a position of the second main surface of the light guide plate with respect to the liquid crystal panel,
the second main surface has a plurality of first inclined surfaces, and
a polarization direction of the lights radiated from the light guide plate and a polarization direction of the light diffusion sheet are set equal to each other.

2. A liquid crystal display device according to claim 1, wherein the first inclined surfaces of the light guide plate are formed such that an angle of the first inclined surface positioned near a position at which the light from the light source is incident on the light guide plate and an angle of the first inclined surface positioned remote from the position at which the light from the light source is incident on the light guide plate differ from each other, and wherein out of the first inclined surfaces, the angle of the first inclined surface positioned near the position at which the light from the light source is incident on the light guide plate is set larger than the angle of the first inclined surface positioned remote from the position at which the light from the light source is incident on the light guide plate.

3. A liquid crystal display device according to claim 1, wherein the light guide plate is formed such that an angle of the inclined surface positioned near a position at which the light from the light source is incident is set to 4 degrees or less.

4. A liquid crystal display device according to claim 1, wherein
the second main surface has second inclined surfaces which abut on the first inclined surfaces,
an angle of the second inclined surface with respect to the first main surface is set larger than an angle of the first inclined surface with respect to the first main surface, and an area of one second inclined surface is set smaller than an area of one first inclined surface.

5. A liquid crystal display device according to claim 1, wherein the light source is formed of a light emitting diode.

6. A liquid crystal display device according to claim 1, wherein the first main surface of the light guide plate is formed in an approximately rectangular shape,
the light source is arranged on a first side surface which abuts on the first main surface of the light guide plate, and
the plurality of inclined surfaces formed on the light guide plate extends in the direction parallel to the first side surface of the light guide plate and is arranged parallel to each other in the direction orthogonal to the first side surface.

7. A liquid crystal display device according to claim 1, wherein the backlight has a prism sheet arranged between the first main surface of the light guide plate and the liquid crystal display panel, and a cross section of the prism sheet has an asymmetrical shape.

8. A liquid crystal display device according to claim 1, wherein the first inclined surface projects outwardly from the second main surface.

9. A liquid crystal display device according to claim 1, wherein the first inclined surface is recessed inwardly from the second main surface.

10. A liquid crystal display device comprising:
a liquid crystal display panel; and
a backlight which radiates lights to the liquid crystal display panel, wherein
the backlight includes a light guide plate, a light source arranged on an outer peripheral portion of the light guide plate, a prism sheet which is arranged between the light guide plate and the liquid crystal display panel, and a light diffusion sheet which is arranged between the light guide plate and the liquid crystal display panel, the light guide plate is made of a transparent plastic resin having a refractive index of 1.53 or less, the light guide plate has a first main surface and a second main surface which faces the first main surface in an opposed manner, the first main surface of the light guide plate is disposed at a position which is closer to the liquid crystal display panel than a position of the second main surface of the light guide plate with respect to the liquid crystal panel, the second main surface has a plurality of first inclined surfaces, and a polarization direction of the lights radiated from the light guide plate and a polarization direction of the light diffusion sheet are set equal to each other.

11. A liquid crystal display device according to claim 10, wherein the first inclined surfaces of the light guide plate are formed such that an angle of the first inclined surface positioned near a position at which the light from the light source is incident on the light guide plate and an angle of the first inclined surface positioned remote from the position at which the light from the light source is incident on the light guide plate differ from each other, and wherein out of the first inclined surfaces, the angle of the first inclined surface positioned near the position at which the light from the light source is incident on the light guide plate is set larger than the angle of the first inclined surface positioned remote from the position at which the light from the light source is incident on the light guide plate.

12. A liquid crystal display device according to claim 10, wherein the light guide plate is formed such that an angle of the inclined surface positioned near the position at which the light from the light source is incident is set to 4 degrees or less.

13. A liquid crystal display device according to claim 10, wherein the second main surface has second inclined surfaces which abut on the first inclined surfaces, an angle of the second inclined surface with respect to the first main surface is set larger than the angle of the first inclined surface with respect to the first main surface, and an area of one second inclined surface is set smaller than an area of one first inclined surface.

14. A liquid crystal display device according to claim 10, wherein the light source is formed of a light emitting diode.

15. A liquid crystal display device according to claim 10, wherein the first main surface of the light guide plate is formed in an approximately rectangular shape, the light source is arranged on a first side surface which abuts on the first main surface of the light guide plate, and the plurality of inclined surfaces formed on the light guide plate extends in the direction parallel to the first side surface of the light guide plate and is arranged parallel to each other in the direction orthogonal to the first side surface.

16. A liquid crystal display device according to claim 10, wherein the first inclined surface projects outwardly from the second main surface.

17. A liquid crystal display device according to claim 10, wherein the first inclined surface is recessed inwardly from the second main surface.

18. A liquid crystal display device according to claim 1, wherein a light emitted from the light source is reflected by the first inclined surface of the second main surface and radiated from the first main surface, and wherein a peak of an intensity of the light radiated from the first main surface is inclined in a direction away from the light source.

19. A liquid crystal display device according to claim 10, wherein a light emitted from the light source is reflected by the first inclined surface of the second main surface and radiated from the first main surface, and wherein a peak of an intensity of the light radiated from the first main surface is inclined in a direction away from the light source.

20. A liquid crystal display device according to claim 19, wherein a cross section of the prism sheet has an asymmetrical shape.

* * * * *